US006745188B2

(12) United States Patent
Bradburn

(10) Patent No.: US 6,745,188 B2
(45) Date of Patent: Jun. 1, 2004

(54) METHODS AND SYSTEMS FOR GENERATING AND MANAGING OFFERINGS

(75) Inventor: James Justin Bradburn, Ridgefield, CT (US)

(73) Assignee: GE Capital Aviation Services, Inc., Stamford, CT (US)

( * ) Notice: Subject to any disclaimer, the term of this patent is extended or adjusted under 35 U.S.C. 154(b) by 83 days.

(21) Appl. No.: 09/681,389

(22) Filed: Mar. 28, 2001

(65) Prior Publication Data

US 2002/0143767 A1 Oct. 3, 2002

(51) Int. Cl.[7] .............................................. G06F 17/30
(52) U.S. Cl. ...................................... 707/10; 707/104.1
(58) Field of Search .............................. 707/1, 2, 3, 10, 707/100, 104.1; 705/26, 27, 37

(56) References Cited

U.S. PATENT DOCUMENTS

| 4,992,940 | A | * | 2/1991 | Dworkin | 705/26 |
| 5,630,125 | A | | 5/1997 | Zellweger | 395/614 |
| 5,664,115 | A | | 9/1997 | Fraser | 705/37 |
| 5,832,459 | A | | 11/1998 | Cameron et al. | 705/26 |
| 6,119,101 | A | * | 9/2000 | Peckover | 705/26 |
| 6,199,077 | B1 | * | 3/2001 | Inala et al. | 707/501.1 |
| 6,272,474 | B1 | * | 8/2001 | Garcia | 705/37 |
| 6,381,597 | B1 | * | 4/2002 | Lin | 707/4 |
| 6,446,045 | B1 | * | 9/2002 | Stone et al. | 705/26 |

OTHER PUBLICATIONS

Vinod Kothari, Financial Instruments: The meaning of a financial instrument, www.india-accounting.com/fininstrubasics.htm.*

Vinod Kothari, Financial instruments: The meaning of a financial Instrument, www.india-accounting.com/fininstrubasics.htm.*

* cited by examiner

Primary Examiner—Diane D. Mizrahi
(74) Attorney, Agent, or Firm—Armstrong Teadale LLP

(57) ABSTRACT

Methods and systems for operating a computer to execute a search to identify potential transactions that meet predefined criteria, generate an offering for at least one of the identified potential transactions, and transmit the offering to a party to the potential transaction is described. In an exemplary embodiment, the offering generated is generated for a secondary product or products which are associated or bundled with the primary transaction. In another exemplary embodiment, the search is automated and performed on-line via a wide area network such as the Internet. The search is automated in that once a user enters search criteria, the search is performed in accordance with a defined frequency and without requiring user intervention. Once search results are found, then an offering is generated and transmitted to a potential customer.

33 Claims, 25 Drawing Sheets

DEFINE SEARCH PARAMETERS

☑ USE STANDARD SEARCH PARAMETERS [VIEW STANDARDS]

SETUP STEP ①②③④⑤⑥

SEARCH PATTERN
○ DAILY   RECUR EVERY [ ] WEEK(S) ON:
⦿ WEEKLY        ☐ MONDAY   ☐ TUESDAY   ☑ WEDNESDAY   ☐ THURSDAY
○ MONTHLY       ☐ FRIDAY   ☐ SATURDAY  ☐ SUNDAY
○ YEARLY

SEARCH TIMING   DAY   MONTH   YEAR    ○ NO END DATE
START BY: [ ] [▷] [▷]                ⦿ END AFTER [5] OCCURENCES
                                      ○ END BY  DAY  MONTH  YEAR
                                               [ ]  [▷]    [▷]

SEARCH DATA RETURNED (IF AVAILABLE)    SORT DATA BY
☐ AIRCRAFT TYPE   ☐ CONTACT NAME       SORT BY
☐ MODEL           ☐ CONTACT TELEPHONE NUMBER   [      ][▷]   ⦿ ASCENDING
☐ ENGINES         ☐ CONTACT EMAIL                            ○ DESCENDING
☐ AGE             ☐ CONTACT FAX        THEN BY
☐ PRICE           ☐ CONTACT MOBILE/PAGER [    ][▷]   ⦿ ASCENDING
                                                     ○ DESCENDING
                                       THEN BY
                                       [      ][▷]   ⦿ ASCENDING
                                                     ○ DESCENDING

[<< GO BACK]   [PROCEED >>]   [EXIT]   [OK]

FIG. 10

SEARCH RESULTS

SEARCH

SEARCH ID #  _____          SEARCH DATE _____

SELECT ALL          [VIEW STANDARDS]

RESULTS STEP ① ② ③ ④ ⑤ ⑥

☐ INTERESTED IN ALL  ◉ STANDARD PRODUCT OFFERING
                     ○ CUSTOM PRODUCT OFFERING
                     ◉ STANDARD OFFERING TEXT
                     ○ CUSTOM OFFERING TEXT

SORT DATA BY

SORT BY ▽  ◉ ASCENDING  ○ DESCENDING

THEN BY ▽  ◉ ASCENDING  ○ DESCENDING

THEN BY ▽  ◉ ASCENDING  ○ DESCENDING

[OK]

[<<GO BACK]   [PROCEED>>]

☐ CUSTOMISE BY RESULT
RESULT 1 OF XXX

AIRCRAFT TYPE   ____
AIRCRAFT MODEL  ____     WEB LOCATION   ____  [VIEW WEBSITE]
ENGINE TYPE     ____     CONTACT NAME   ____
AIRCRAFT AGE    ____     TELEPHONE      ____  ☐ INTERESTED
AIRCRAFT PRICE  ____     EMAIL          ____
                         FAX            ____
                         MOBILE/PAGER   ____

[VIEW STANDARDS]

◉ STANDARD PRODUCT OFFERING
○ CUSTOM PRODUCT OFFERING
◉ STANDARD OFFERING TEXT
○ CUSTOM OFFERING TEXT

[<<GO BACK]   [PROCEED>>]   [EXIT]

CUSTOMISE OFFERING TEST

SEARCH
SEARCH NAME [      ]           SEARCH DATE [      ]

RESULTS STEP ①②③④⑤⑥

ONLY RESULTS WHICH WERE CHECKED AS 'INTERESTED' AND 'CUSTOM TEXT OFFERING' APPEAR

RESULT 1 OF XXX

| | |
|---|---|
| AIRCRAFT TYPE [  ] | WEB LOCATION [  ] |
| AIRCRAFT MODEL [  ] | CONTACT NAME [  ] |
| ENGINE TYPE [  ] | TELEPHONE [  ] |
| AIRCRAFT AGE [  ] | EMAIL [  ] |
| AIRCRAFT PRICE [  ] | FAX [  ] |
| | MOBILE/PAGER [  ] |

CUSTOMISE OFFERING TEXT

DEAR [NAME]
[COMPANY NAME] WOULD LIKE TO OFFER YOU THE FOLLOWING PRODUCTS [PRODUCTS] WHICH YOU CAN OFFER TO YOUR CUSTOMERS AS YOU NEGOTIATE THE SALE OF THIS [AIRCRAFT].
IF YOU HAVE ANY QUESTIONS PLEASE EMAIL ME AT [EMAIL] OR CONTACT ME AT [TELEPHONE].

RESULT 2 OF XXX

| | |
|---|---|
| AIRCRAFT TYPE [  ] | WEB LOCATION [  ] |
| AIRCRAFT MODEL [  ] | CONTACT NAME [  ] |
| ENGINE TYPE [  ] | TELEPHONE [  ] |
| AIRCRAFT AGE [  ] | EMAIL [  ] |
| AIRCRAFT PRICE [  ] | FAX [  ] |
| | MOBILE/PAGER [  ] |

CUSTOMISE OFFERING TEXT

DEAR [NAME]
[COMPANY NAME] WOULD LIKE TO OFFER YOU THE FOLLOWING PRODUCTS [PRODUCTS] WHICH YOU CAN OFFER TO YOUR CUSTOMERS AS YOU NEGOTIATE THE SALE OF THIS [AIRCRAFT].
IF YOU HAVE ANY QUESTIONS PLEASE EMAIL ME AT [EMAIL] OR CONTACT ME AT [TELEPHONE].

RESULT 3 OF XXX

| | |
|---|---|
| AIRCRAFT TYPE [  ] | WEB LOCATION [  ] |
| AIRCRAFT MODEL [  ] | CONTACT NAME [  ] |
| ENGINE TYPE [  ] | TELEPHONE [  ] |
| AIRCRAFT AGE [  ] | EMAIL [  ] |
| AIRCRAFT PRICE [  ] | FAX [  ] |
| | MOBILE/PAGER [  ] |

CUSTOMISE OFFERING TEXT

DEAR [NAME]
[COMPANY NAME] WOULD LIKE TO OFFER YOU THE FOLLOWING PRODUCTS [PRODUCTS] WHICH YOU CAN OFFER TO YOUR CUSTOMERS AS YOU NEGOTIATE THE SALE OF THIS [AIRCRAFT].
IF YOU HAVE ANY QUESTIONS PLEASE EMAIL ME AT [EMAIL] OR CONTACT ME AT [TELEPHONE].

[<<GO BACK]    [PROCEED>>]    [EXIT]

FIG. 16

OFFER SENT CONFIRMATION

RESULTS STEP ① ② ③ ④ ⑤ ⑥

YOUR OFFERING HAS BEEN SENT. YOU CAN ACCESS THIS OFFERING WITH THE FOLLOWING ID NUMBER [ ]. A CONFIRMATION EMAIL HAS BEEN SENT (IF THE NOTIFICATION OPTION WAS SELECTED) TO YOUR SELECTED NOTIFICATION METHOD(S). PLEASE USE THIS ID NUMBER AND YOUR SELECTED USERNAME AND PASSWORD TO ACCESS YOUR OFFERING AT A LATER DATE.

YOU CAN ALSO USE THIS ID NUMBER TO LOCATE A OFFERING PROFILE AND AMEND IT

☐ I WANT MY OFFERING TO GO AUTOMATICALLY EVERY TIME AFTER THIS UNLESS THE SEARCH RESULT CHANGES

[ GO TO THIS OFFERING RESULTS ]

[ GO TO SEARCH SETUP ] [ GO TO ALL SEARCH RESULTS ] [ GO TO ALL OFFERINGS ] [ EXIT ]

LOCATE OFFERINGS

LOCATE OFFERING
USE ONE OF THE FOLLOWING TO LOCATE YOUR OFFERING.

ENTER OFFERING ID#
LOCATE OFFERING ID#

OFFER SENT/DUE BETWEEN
DAY  MONTH  YEAR   AND   DAY  MONTH  YEAR

[FIND ALL OFFERINGS]   [EXIT]

OFFERINGS FOUND   THIS BOX APPEARS WHEN THE BUTTON ABOVE IS CLICKED
OFFERING ID#  DATE DUE  DATE SENT  SENT? SEND?

[VIEW] [AMEND]
[VIEW] [AMEND]
[VIEW] [AMEND]
[VIEW] [AMEND]
[VIEW] [AMEND]
[VIEW] [AMEND]

[SEND OFFERING(S) >>]   [EXIT]

STANDARD SEARCH PARAMETERS

[AMEND STANDARD]

SEARCH PATTERN
○ DAILY    RECUR EVERY [ ] WEEK(S) ON:
◉ WEEKLY           ☐ MONDAY   ☐ TUESDAY   ☑ WEDNESDAY   ☐ THURSDAY
○ MONTHLY          ☐ FRIDAY   ☐ SATURDAY  ☐ SUNDAY
○ YEARLY

SEARCH TIMING  DAY   MONTH   YEAR       ○ NO END DATE
START BY: [▽] [▽] [▽]                   ◉ END AFTER [5] OCCURENCES
                                        ○ END BY  DAY  MONTH  YEAR
                                                  [▽]  [▽]    [▽]

SEARCH DATA RETURNED (IF AVAILABLE)       SORT DATA BY
☐ AIRCRAFT TYPE  ☐ CONTACT NAME           SORT BY
☐ MODEL          ☐ CONTACT TELEPHONE NUMBER  [▽]   ◉ ASCENDING
☐ ENGINES        ☐ CONTACT EMAIL                  ○ DESCENDING
☐ AGE            ☐ CONTACT FAX            THEN BY
☐ PRICE          ☐ CONTACT MOBILE/PAGER      [▽]   ◉ ASCENDING
                                                  ○ DESCENDING
STANDARD NOTIFICATION SETUP               THEN BY
NOTIFICATION TYPE                            [▽]   ◉ ASCENDING
☐ SEARCH ID #    ☐ OFFER DUE                      ○ DESCENDING
☐ OFFER ID #     ☐ OFFER SENT

[AMEND STANDARD]      [OK]

FIG. 21

STANDARD NOTIFICATION SETUP

NOTIFICATION TYPE

☐ SEARCH ID # ☐ NEW SEARCH CRITERIA FOUND ☐ OFFER DUE
☐ OFFER ID # ☐ OLD SEARCH CRITERIA RE-FOUND ☐ OFFER SENT

[AMEND STANDARD]

GENERAL
INTRANET
DESKTOP EMAIL    EMAIL ADDRESS [VIEW/AMEND PROFILE] (WHATS THIS)

WIRELESS DEVICES
☐ WEBPHONE    CELL PHONE PLAN                (WHATS THIS)
              PHONE NUMBER                   (WHATS THIS)
☐ EMAIL PAGER PAGER PLAN                     (WHATS THIS)
              NUMBER                         (WHATS THIS)
☐ PDA         PDA TYPE                       (WHATS THIS)
              PDA ADDRESS                    (WHATS THIS)

INSTANT MESSENGERS
☐                                            (WHATS THIS)
☐                                            (WHATS THIS)
☐                                            (WHATS THIS) @
☐                                            (WHATS THIS)

STANDARD PRODUCTS OFFERED
PRODUCT OFFERINGS    YES    [AMEND STANDARD]

CUSTOM OFFERING TEXT                STANDARD OFFERING TEXT
DEAR [NAME]                                              [AMEND STANDARD]

METHODS AND SYSTEMS FOR GENERATING AND MANAGING OFFERINGS

BACKGROUND OF INVENTION

This invention relates generally to asset funding, and more particularly, to automated identification of assets subject to transactions and automated offerings of financing in connection with such transactions.

Assets such as aircraft, locomotives, rail cars, and barges often are sold, leased or financed many times over the course of their useful lives. When such assets are sold, the purchaser often secures financing. More specifically, the purchaser typically identifies a number of financing sources and then selects one financing source for the transaction. The seller also may work with financing sources and explain to prospective purchasers that financing from a particular source is available for the transaction.

Financing sources typically market their services through various media. The marketing efforts also may be directed to both regular sellers and purchasers of specific types of assets. In addition, these financing entities also may search publications for information relating to assets being offered for sale. The known techniques for identifying sellers of assets as well as identifying assets being offered for sale are manually intensive and requires resources and time.

In addition, once a prospective customer for a financing product has been identified, i.e., a seller of an asset, an individual from the financing entity marketing operation may contact the prospective seller, explain the various financing products available, and work with the prospective seller towards closing the deal with the purchaser. Of course, numerous attempts may be required in order to make such contact, and once contact is made, it may require several conversations before an applicable financing product is identified and offered to the prospective purchaser.

SUMMARY OF THE INVENTION

In one aspect, a method for operating a computer to execute a search to identify potential transactions that meet pre-defined criteria, generate an offering for at least one of the identified potential transactions, and transmit the offering to a party for the potential transaction is described. In an exemplary embodiment, the search is automated and performed on-line via a wide area network such as the Internet. The search is automated in that once a user enters search criteria, the search is performed in accordance with a defined frequency and without requiring user intervention. Once search results are found, then an offering is generated and transmitted to a potential customer. Depending on the type of the transaction, a customer may be identified either as a buyer or a seller.

In another aspect, a database comprising data corresponding searches to be performed, and data corresponding to offerings generated utilizing search results from the performed searches, is described. The search criteria and search results are stored in the database. Once search results are found, then the data stored in the database is utilized to generate an offering that is then transmitted to a potential customer. Data related to the offering also is stored in the database.

In yet another aspect, a system for searching and generating offerings is described. In an exemplary embodiment, the system includes a database and a server coupled to the database. The database includes data corresponding searches to be performed and data corresponding to offerings generated utilizing search results from the performed searches. The server is configured to execute a search to identify potential transactions that meet pre-defined criteria, generate an offering for at least one of the identified potential transactions, and transmit the offering to a party to the potential transaction.

BRIEF DESCRIPTION OF DRAWINGS

FIGS. 4 and 5 illustrate an exemplary screen shot of a register screen.

FIG. 6 is an exemplary screen shot of a screen for defining asset types.

FIG. 7 illustrates an exemplary screen shot of a screen for refining asset types.

FIG. 9 illustrates an exemplary screen shot of a screen for defining search targets.

FIG. 10 illustrates an exemplary screen shot for defining search parameters.

FIG. 14 illustrates an exemplary screen shot for a screen for viewing search results.

FIG. 15 illustrates an exemplary screen shot for a screen for customizing product offerings.

FIG. 16 illustrates an exemplary screen shot for a screen for customizing product text offerings.

FIG. 17 illustrates an exemplary screen shot for a screen for confirming that an offer had been sent.

FIG. 18 illustrates an exemplary screen shot for a screen for viewing offerings.

FIG. 19 illustrates an exemplary screen shot for a screen for locating offerings.

Figure 23:
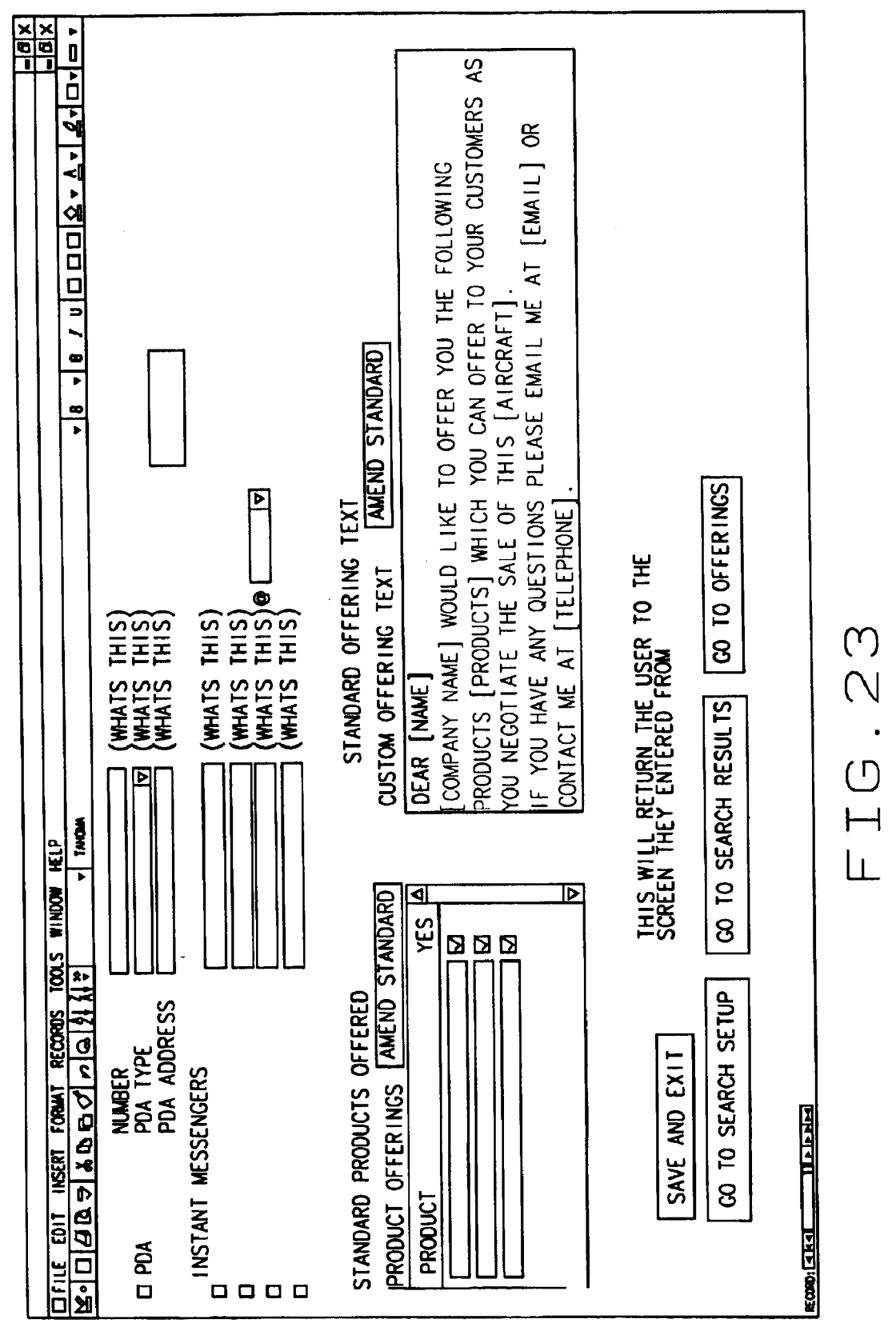

FIGS. 20–23 illustrate an exemplary screen shot for a screen for defining standards.

Figure 24:
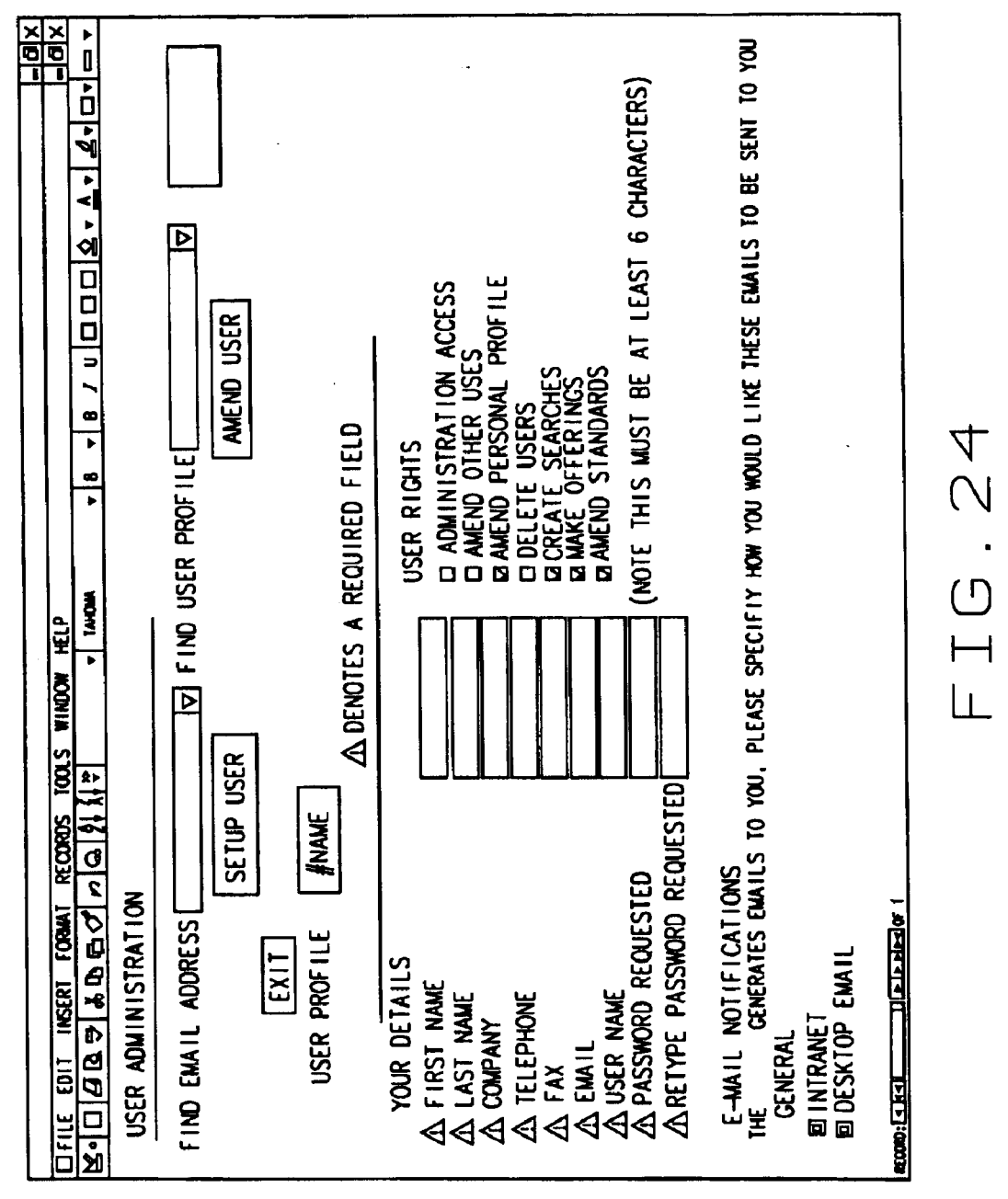

FIGS. 24–25 illustrate an exemplary screen shot for managing user administration.

DETAILED DESCRIPTION

Set forth below is a description of methods and systems for an automated deal lead generator which searches for and locates assets for sale, and offers financing products to potential customers of those assets. Depending on the type of the transaction, customers may be identified either as buyers or sellers. While the methods and systems are sometimes described in the context of aircraft, the methods and systems are not limited to practice in connection with only aircraft. The methods and systems can be used, for example, in connection with automobiles, rail cars, barges, and many other different types of assets.

In an exemplary system, a web server coupled to an application server performs the search and offer utilizing the internet. The application server includes a search engine for performing searches, via the web server, on the internet as described below in more detail. In the exemplary system, a database server is coupled to the application server.

Generally, a user defines asset types to search for as well as select sites to be searched. The user also defines the search parameters and sets-up, and designates, notification types and methods. The user defined assets and searches are stored in the database server and used by the application server in performing the search.

Specifically, the system searches for the user defined asset types on the user selected sites. Such a search is performed in accordance with the search parameters (e.g., at pre-designated intervals), and the search results are stored in the database. The user is notified that a search result or results have been found via the notification method selected by the user. A user can then review the search results.

In addition to the automated searching as described above, the system generates offerings that are sent to potential customers. Specifically, the user specifies pre-defined text and product types to be transmitted to a potential customer via e-mail, fax, or otherwise, upon identification of such potential customer by the user from the search results. Each offer also is stored in the database so that the user can review each offer.

The search and offer systems and methods facilitate effective searching and identification of deals. In addition, such methods and systems also facilitate effective sourcing of deals.

Figure 1:
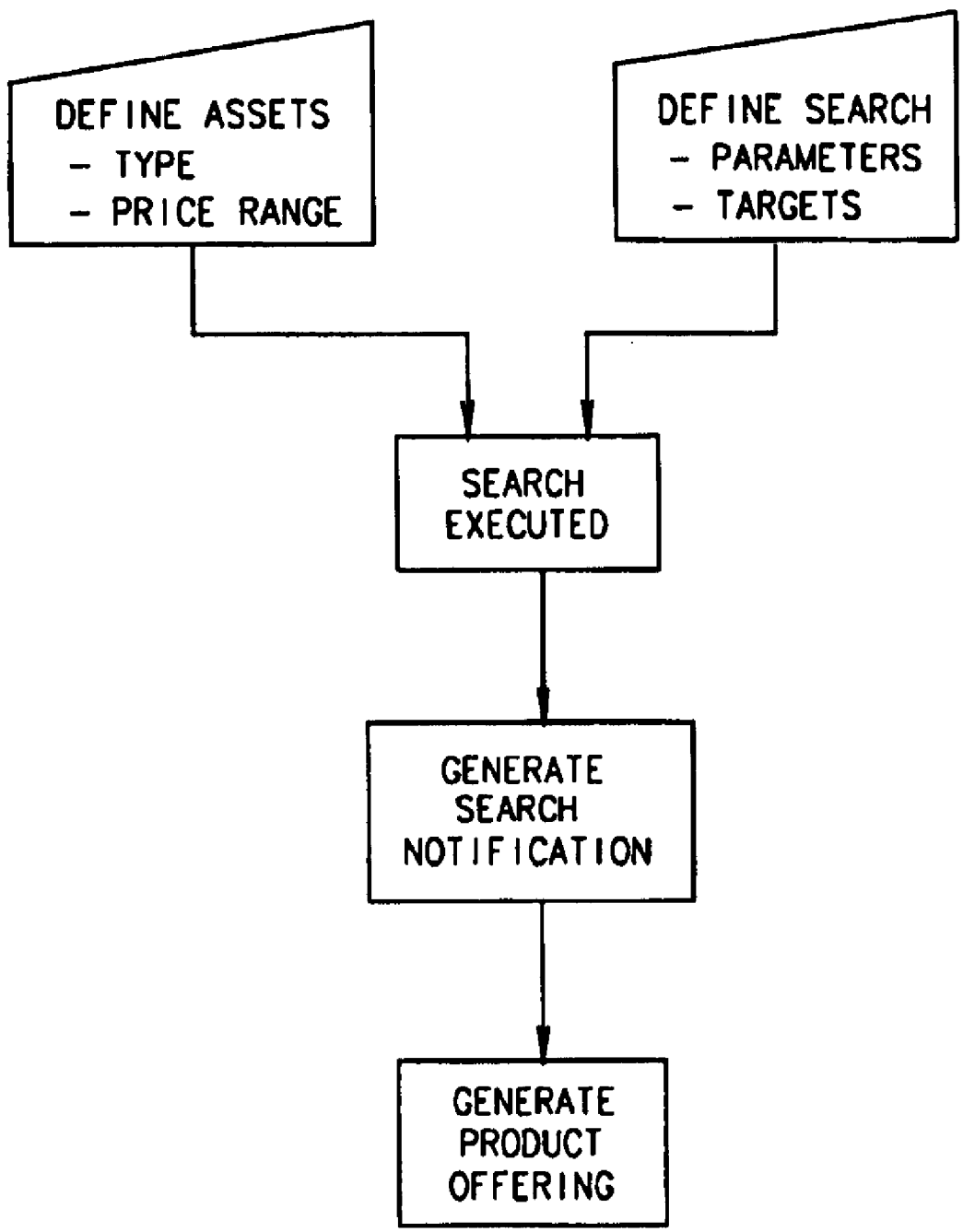
FIG. 1 a flow chart illustrating process steps for automated searching and product offering.

FIG. 1 a flow chart illustrating steps of an exemplary process for automated searching and product offering. As shown in FIG. 1, a user initially defines assets to be identified and searches to be performed. The assets can be a wide variety of types, and the method is not limited to practice in connection with any one particular asset type. For example, if the asset is an aircraft, then the asset can be defined by aircraft type, aircraft model, engine type, and aircraft age.

In addition, a search to be performed is identified. For example, the user selects web sites and web publications to be searched. The user also defines the search parameters. For example, the user specifies a search pattern (e.g., define whether the search is conducted daily, weekly, monthly, or yearly) and a search timing (e.g., define the day, month, and year the search is to be initiated).

Once the assets and search are defined, then a search is executed by the system. For example, a defined web publication is searched with the defined frequency, and the results of the search are returned if such results are within the defined parameters for the asset. The search results are stored in the database server. The system also alerts the user that a search has been completed and that assets have been identified. Specifically, the system generates a search notification that is communicated to the user, e.g., via e-mail, a fax, a page. The user can define the notification method based on various options available.

The system also generates a product offering. In an exemplary embodiment, the user identifies search results and selects pre-defined text and product types which are then transmitted to the customer via user requested notification method. In an exemplary embodiment, notification method is a notification via an electronic mail. In yet another embodiment, notification may be via a fax. The user can also define that if the same text result is found in subsequent searches, same offer will go automatically to the seller. For example, if an aircraft is identified that is the subject of a negotiation, the system generates an offering identifying financing that the seller of the aircraft could offer a prospective buyer in connection with the purchase or lease of the aircraft.

Set forth below are descriptions of specific exemplary embodiments of systems and methods for identifying assets being sold or financed and offering financing products that the sellers or lessors of those assets can utilize in connection with negotiating transactions with potential buyers. The systems and methods are not, of course, limited to the exemplary embodiments described below.

Figure 2:
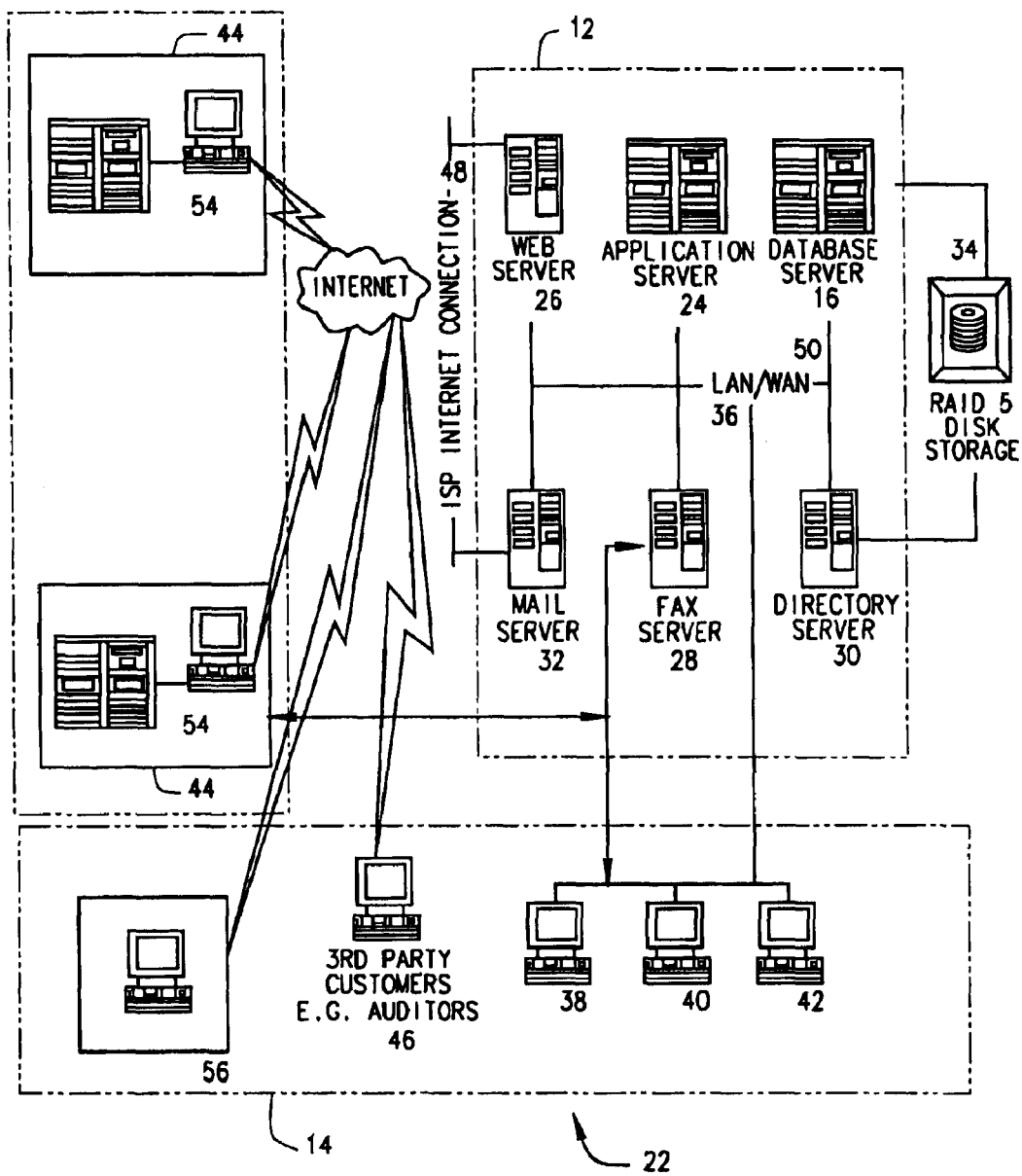
FIG. 2 is a block diagram of a network based system.

FIG. 2 is a block diagram of a network based system 22. System 22 includes server sub-system 12 and end user devices 14. Server sub-system 12 includes database server 16, an application server 24, a web server 26, a fax server 28, a directory server 30, and a mail server 32. A disk storage unit 34 is coupled to database server 16 and directory server 30. Servers 16, 24, 26, 28, 30, and 32 are coupled in a local area network (LAN) 36. In addition, a system administrator work station 38, a work station 40, and a supervisor work station 42 are coupled to LAN 36. Alternatively, work stations 38, 40, and 42 are coupled to LAN 36 via an Internet link or are connected through an intranet.

Each work station 38, 40, and 42 is a personal computer including a web browser. Although the functions performed at the work stations typically are illustrated as being performed at respective work stations 38, 40, and 42, such functions can be performed at one of many personal computers coupled to LAN 36. Work stations 38, 40, and 42 are illustrated as being associated with separate functions only to facilitate an understanding of the different types of functions that can be performed by individuals having access to LAN 36.

Server sub-system 12 is configured to be communicatively coupled to various individuals or sites 44 via an ISP Internet connection 48. The communication in the exemplary embodiment is illustrated as being performed via the Internet, however, any other wide area network (WAN) type communication can be utilized in other embodiments, i.e., the systems and processes are not limited to being practiced via the Internet. In addition, and rather than a WAN 50, local area network 36 could be used in place of WAN 50.

In the exemplary embodiment, an individual (e.g., an employee) 44 having a work station 52 can access server sub-system 12. Work station 52 is a personal computers including a web browser. Also, work station 52 is configured to communicate with server sub-system 12. Furthermore, fax server 28 communicates with individuals 44 and other work stations 38, 40, and 42 as well.

In one specific exemplary embodiment, the following commercially available hardware and software are utilized: Web Server platform Windows NT 4.0 SP 5; Database Server platform Windows NT 4.0; Internet Information Server (IIS) 4.0; Microsoft Transaction Server (MTS); COM objects using VB 6.0 dlls; Active Server Pages 3.0; JScript 5.0; VBScript 5.0; and Database Oracle 8.1.6 and 8.0.5. The extranet site operates under IE 4.0 and Netscape 4.0.

Figure 25:
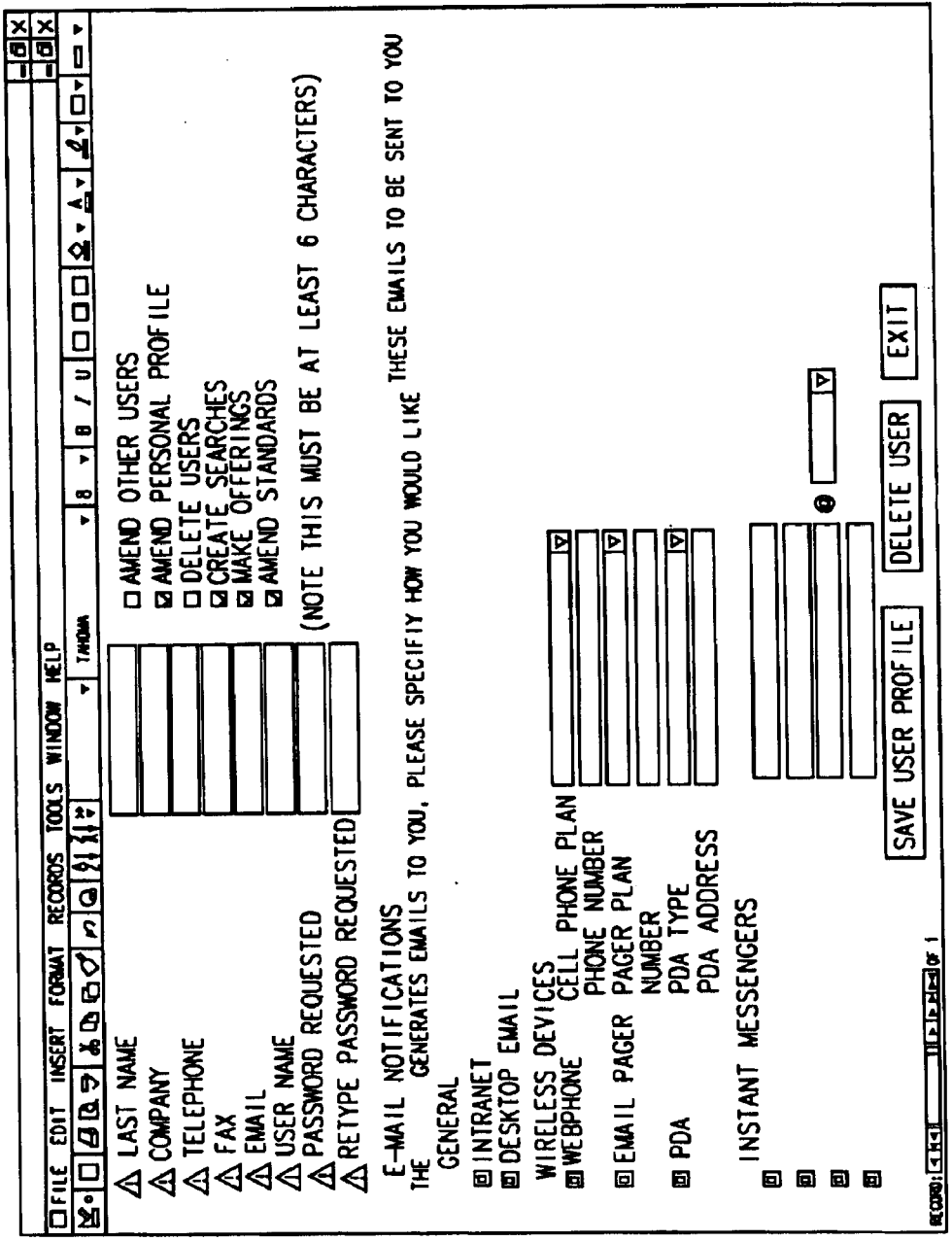

Set forth below are details regarding exemplary screen shots displayed by system. Generally, the following screen shots illustrate exemplary screens for log on and registration (FIGS. 3–5), search set-up (FIGS. 6–12), results review (FIGS. 13–17), offering review (FIGS. 18 19), standards definition (FIGS. 20–23), and administration (FIGS. 24–25).

Figure 3:
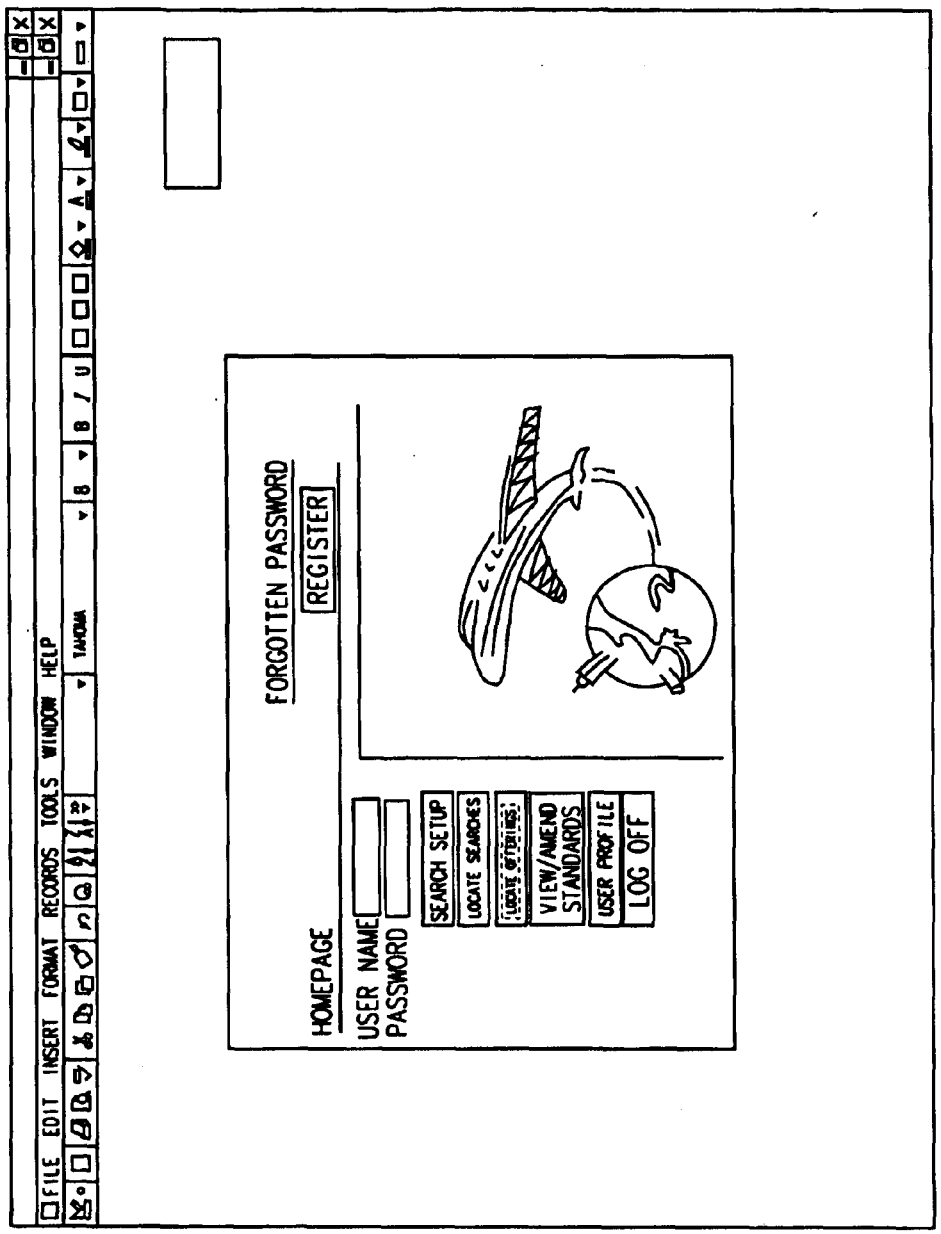
FIG. 3 is an exemplary screen shot of a log-on screen.

FIG. 3 is an exemplary screen shot of a log-on screen. Users are required to enter a User Name and Password. The log-on screen can be accessed via an intranet or the internet.

Generally, via the log-on screen, users can access the search set up, search results, offerings, user administration, and registration Specifically, after logging on, the user can select Search Setup (FIG. 6), Locate Searches (FIG. 13), Locate Offerings (FIG. 19), View/Amend Standards (FIG. 20), User Profile (FIG. 24), and Exit.

Users will can select Register (FIG. 4) to register for the site or select "forgotten password" to generate an email. The email is automatically addressed to the webmaster for the site with the subject "Forgotten Password" and in the message area the text "Please send me my password". The user can enter additional information in the message area.

Figure 4:
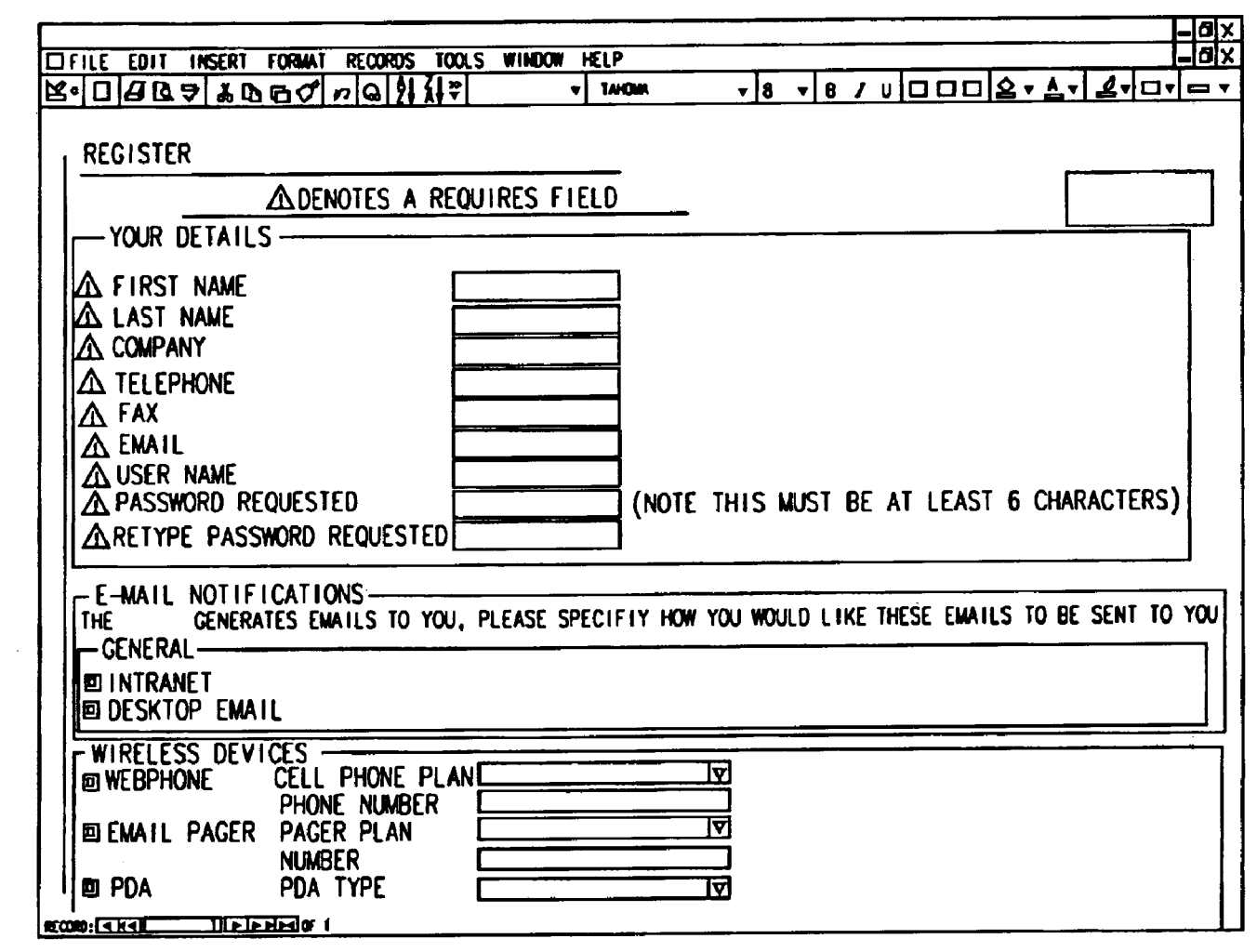
Figure 5:
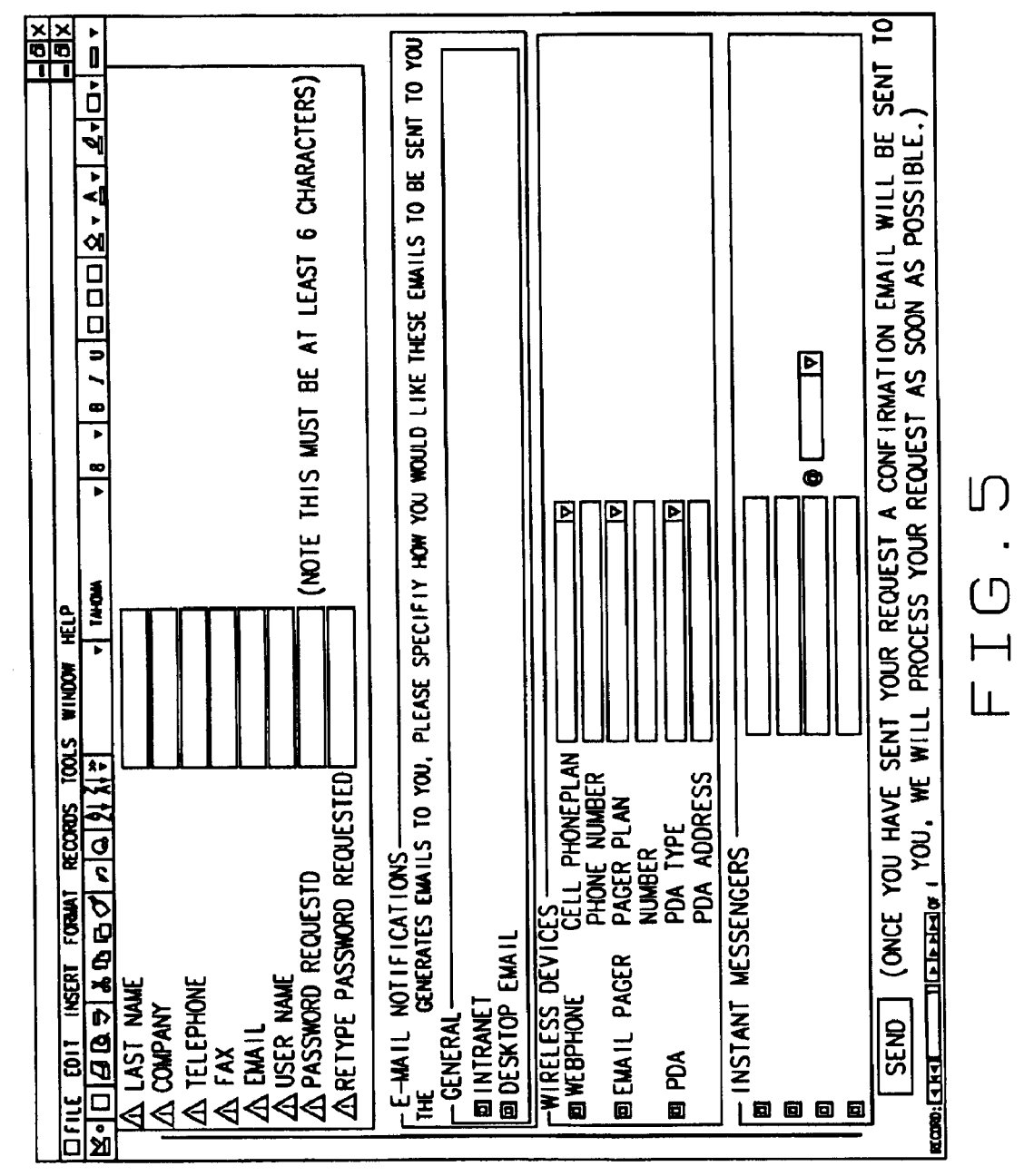

FIGS. 4 and 5 illustrate an exemplary screen shot of a register screen. The user can enter details about himself and submit the information to the webmaster via the register screen to be set-up as an authorized user. More specifically, the user is prompted to enter first name, last name, company, telephone, fax, e-mail, User Name, and a password. The user can also define how notifications are to be sent, e.g., e-mail, wireless devices, instant messengers. Once the fields are populated and the notification selections are made, and after the user selects Send, processing returns to the page illustrated in FIG. 3. In addition, the user entered data is saved in the database and an e-mail is sent to the web master informing the web master that a new user has requested registration. The web master can then authorize a new user as described below in connection with FIG. 24.

Figure 6:
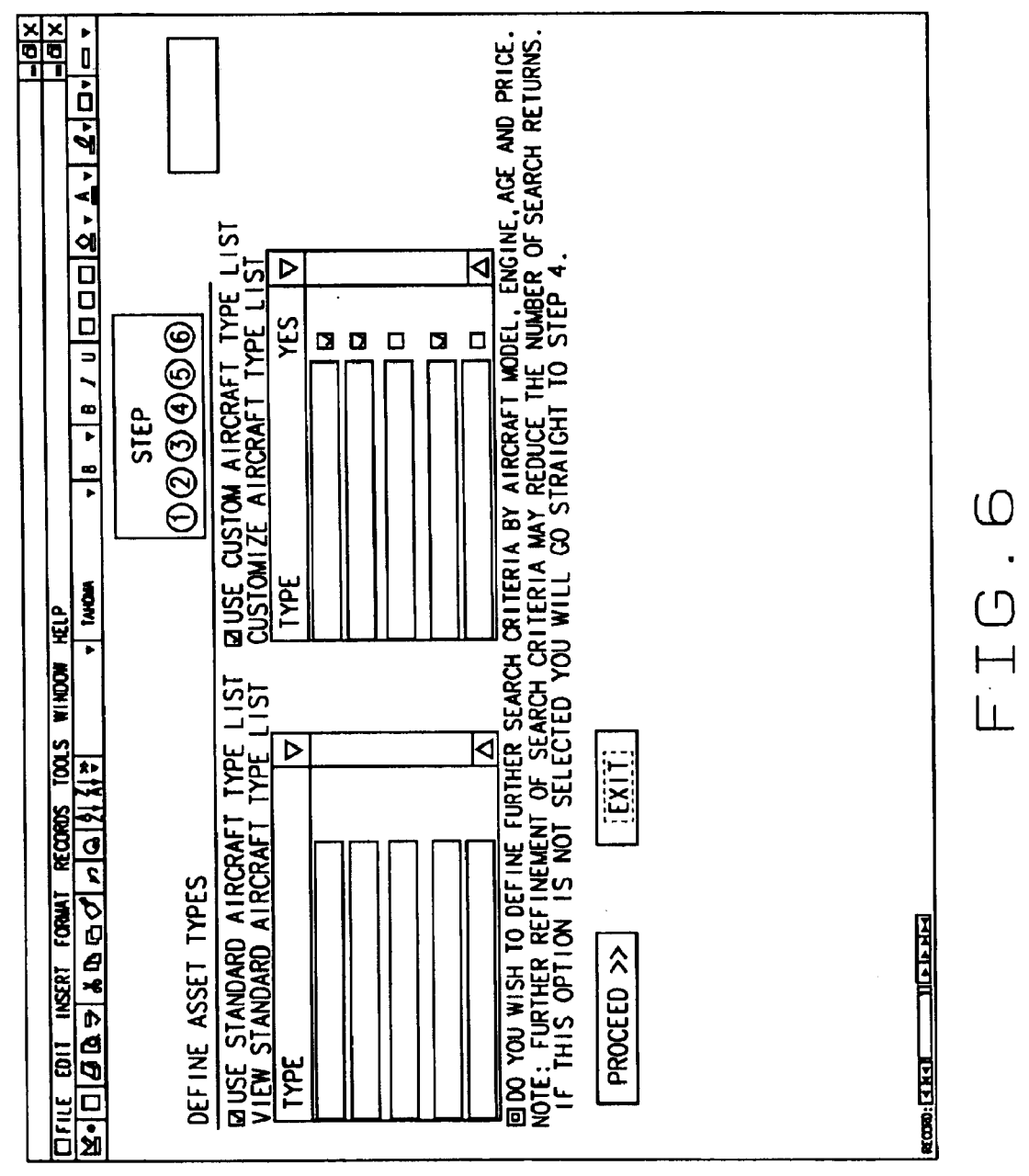

FIG. 6 is an exemplary screen shot for defining asset types. Using this screen, users select the aircraft types to be searched. At the top of this screen, a graphic is displayed illustrating the step being executed by the user. The graphic communicates to the user how many steps are involved in the process and where they are in the process.

Two "check" box options are above the tables, i.e., view standard aircraft type list and use custom aircraft type list. By selecting view standard aircraft type list, the user indicates that standard asset types listed in the standards table are to be searched. The standard tables are discussed below in more detail in connection with FIG. 20. By selecting use custom aircraft type list, the user indicates that a customized list of aircraft types is to be searched. The tables are displayed, and each table is imbedded within the main screen with associated vertical scroll bars.

Regarding the customized aircraft type list, the user can use this list to view all asset types (in the database) and select individual aircraft types to be searched. Next to each aircraft type is a "check" box. By checking a box, the user indicates the asset type to be searched.

Below the tables, a "check" box provides the user with an option to further customize the search criteria (e.g., aircraft model, engine, age and price). If the User selects this option, when the user selects "Proceed", processing proceeds the screen shot illustrated in FIG. 7. If the User does not select this option, processing proceeds to the screen shot illustrated in FIG. 9.

Figure 7:
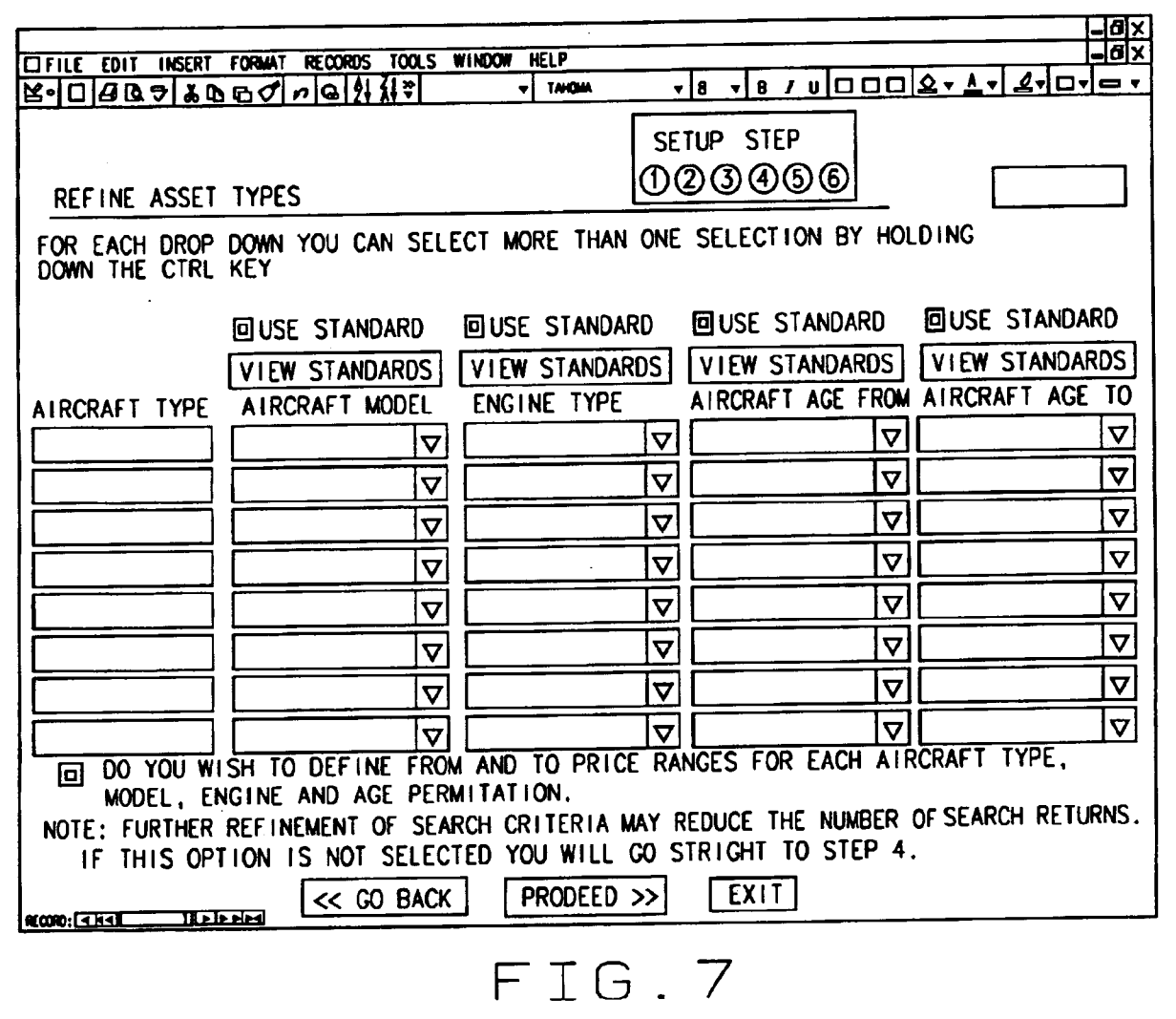

FIG. 7 illustrates an exemplary screen shot for refining asset types. Using this screen, users can refine the search criteria for each aircraft type that was selected on the screen illustrated in FIG. 6. Columns of data are displayed based on the options selected by the User. Specifically, if the user selected the standard list option, all aircraft types in the standard list are displayed. If the user customized the list of aircraft to be searched, all aircraft types that were "checked" in the table are displayed.

For each aircraft model, each drop down list displays the model types that are applicable for the aircraft type in the corresponding row. Similarly, for engine type, each drop down list displays the engine types that are applicable for the aircraft type in the corresponding row. For aircraft age from and to, each drop down list has a series of options the user can select from.

Above Aircraft Model, engine Type, Aircraft Age From, and Aircraft Age To, the user has the option to select "Use Standards". The standards are defined in the standards table as described below in connection with FIG. 20. In addition, below each Use Standards selection is a View Standards selection. By selecting View Standards, processing proceeds to the screen shown in FIG. 20.

Figure 8:
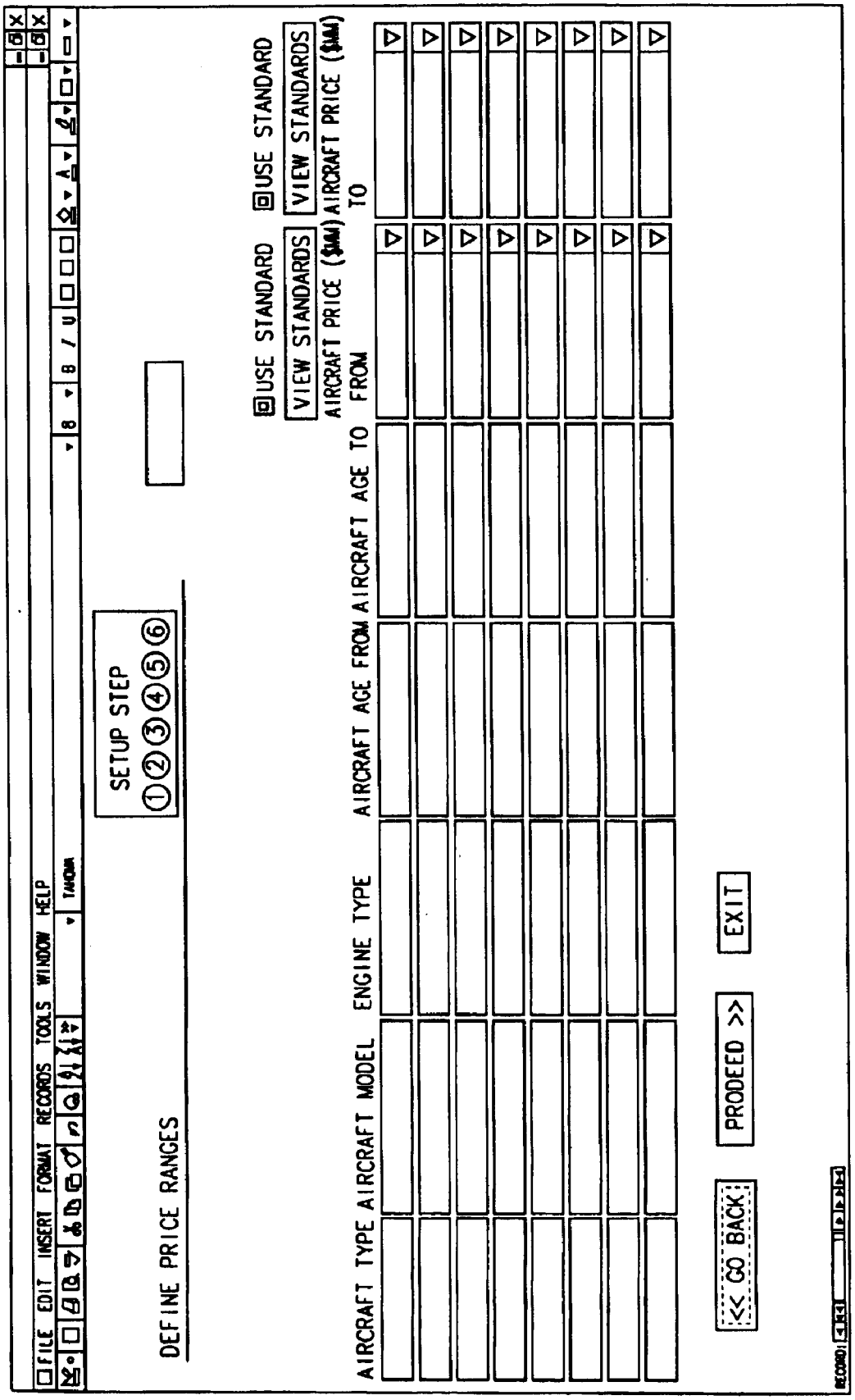
FIG. 8 illustrates an exemplary screen shot of a screen for defining price ranges.

Below the columns there is a "check box" that if selected by the user, causes processing to proceed to FIG. 8 upon selecting Proceed. This screen allows the user to select whether to further refine the search by "Price To" and "Price from". If the user does not select to define from and to price ranges, then processing proceeds to the screen shown in FIG. 9. The user can also select "Go Back" to return processing to the screen shown in FIG. 7 or EXIT to return processing to the screen shown in FIG. 3 FIG. 8 illustrates an exemplary screen shot for defining price ranges. Using this screen, users can refine the search criteria by "Aircraft Price From" and "Aircraft Price To" for the selections chosen on the screen illustrated in FIG. 7.

The following columns of data will appear. The number of rows is dictated by the number of unique variations in "Aircraft Type", "Aircraft Model", "Engine Type", "Aircraft Age From" and "Aircraft Age To" that the user selected, e.g., if the user selects 1 "Aircraft Type", 4 "Aircraft Model", 6 "Engine Type", 2 "Aircraft Age From" and 2 "Aircraft Age To", 96 rows of data will be shown.

For aircraft price from and to, each drop down list has a series of options that can be selected by the user. The user also has the option to select "Use Standards". The standards are defined in the standards table as described below in connection with FIG. 20.

In addition, below each Use Standards selection is a View Standards selection. By selecting View Standards, processing proceeds to the screen shown in FIG. 20.

Figure 9:
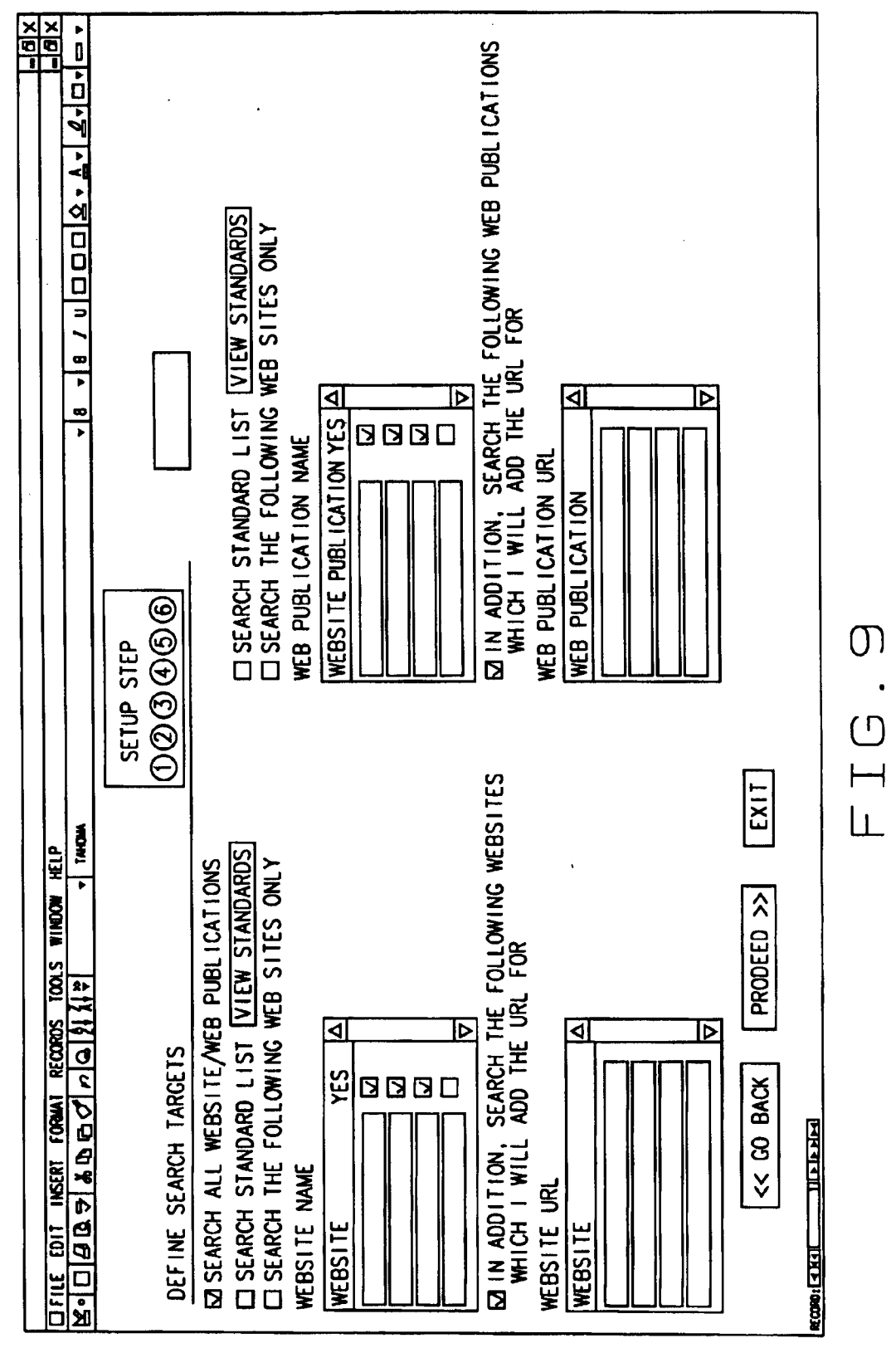

Upon selecting Proceed, processing proceeds to the screen shown in FIG. 9. The user can also select "Go Back" to return processing to the screen shown in FIG. 7 or EXIT to return processing to the screen shown in FIG. 3.

FIG. 9 illustrates an exemplary screen shot for defining search targets. Using this screen, users select the web sites and web publications to be searched. More specifically, the screen includes a web site selection section and a web publication section. A user can select to have all web sites and web publications searched, and if the user so selects, then other options on the screen are not selectable. In addition, if "Search Standard List" is selected, then "Search The Following Web Sites Only" cannot be selected and visa versa. The same applies for web publications.

Figure 20:
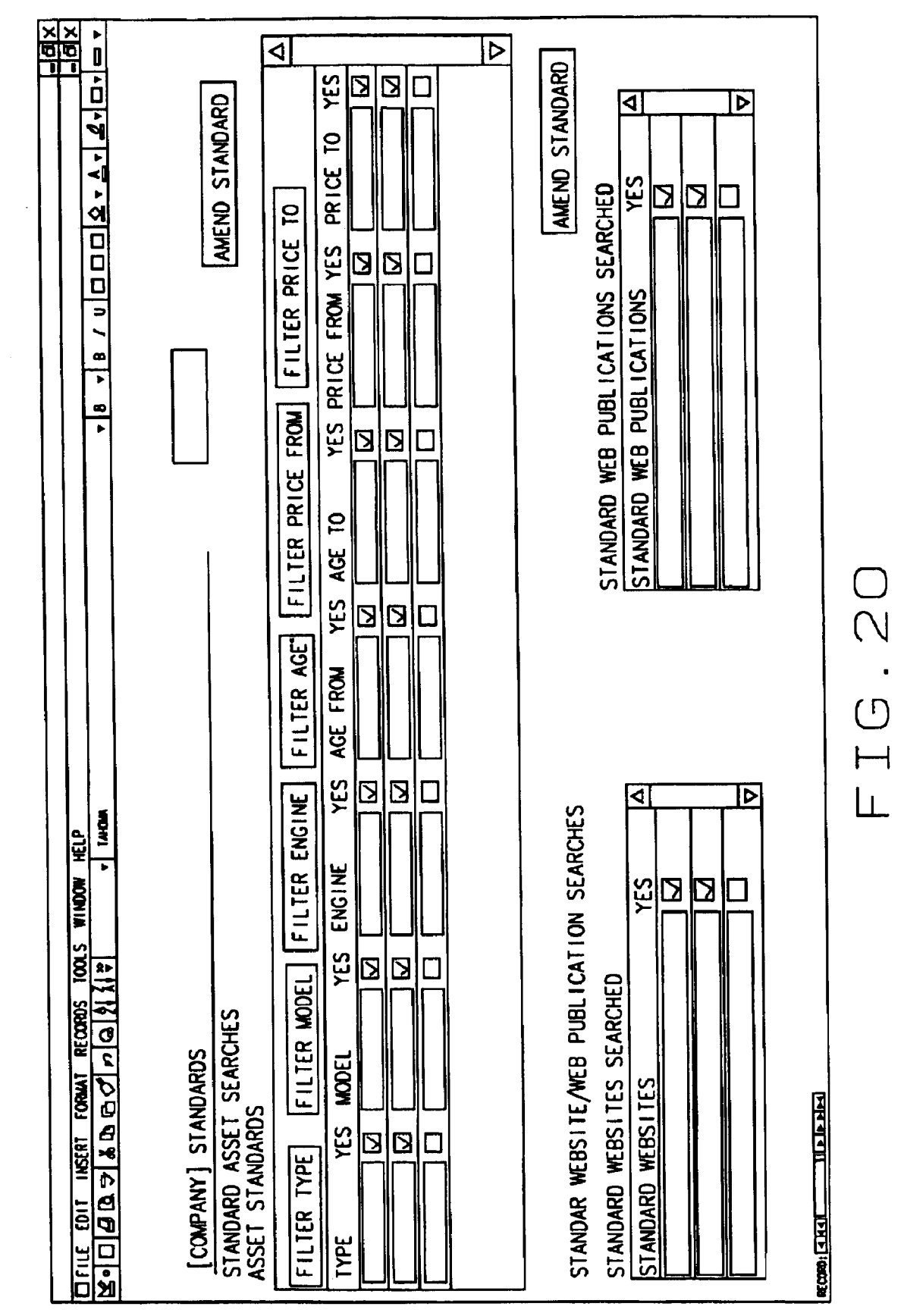

In the web site selection section, users can select Search Standard List. If selected, then web sites that have been selected as described below in connection with FIG. 20 are searched. Next to the "Search Standard List" "check" box is a command button that will take the user to the screen illustrated in FIG. 20, which displays the standards so that an informed decision can be made whether to select "Use Standards".

If search the following web sites only is checked, then only the web sites that have been checked in the table will be searched. The table has a list of the standard web sites. Next to each web site name is a "check" box. The User selects the web sites to be searched. If the user selects any web sites, then the search the following web sites only check box is automatically selected.

The user can also select the check box associated with the text In addition, search the following websites which I will add the URL for. If the user selects this option, the user then enters the URL for each additional web site to be searched.

For the web publication section, users can select Search Standard List. If selected, then web publications that have been selected as described below in connection with FIG. 20 are searched. Next to the "Search Standard List" "check" box is a command button that will take the user to the screen illustrated in FIG. 20, which displays the standards so that an informed decision can be made whether to select "Use Standards".

If search the following web publications only is checked, then only the web publications that have been checked in the table will be searched. The table has a list of the standard web publications. Next to each web publication name is a "check" box. The user selects the web publications to be searched. If the user selects any web publication, then the search the following web publications only check box is automatically selected.

The user can also select the check box associated with the text In addition, search the following web publications which I will add the URL for. If the user selects this option, the user then enters the URL for each additional web site to be searched.

Upon selecting Proceed, processing proceeds to the screen shown in FIG. 10. The user can also select "Go Back" to return processing to the screen shown in FIG. 8 or EXIT to return processing to the screen shown in FIG. 3.

FIG. 10 illustrates an exemplary screen shot for defining search parameters. Using this screen, users define the search parameters to be utilized in performing the search. By selecting Use standard search parameters, the standard search parameters defined as described below in connection with the screen shown in FIG. 20 will be used. Next to the "Use standard search parameters" "check" box is a command button that results in processing proceeding to the screen shown in FIG. 20 so that the user can make an informed decision whether to select the "Use Standard Search Parameters".

If the standard search parameters are not used, then the user selects a search pattern, a search timing, and defines the search data returned. For search pattern the user selects a period, e.g., daily, weekly, monthly or yearly, a recurrence, e.g., if the user selects a weekly search pattern, the user defines the number of weeks between occurrences. Similarly, if the user selects weekly, the user also can define the day on which the search is performed.

The user also selects a search timing. Specifically, the user defines a day, month and year (via drop down boxes) the search is to be initiated. If the user selects No end date, the search will repeat continuously. If the user selects End after x occurrences, then after entering a value for x, the search is conducted x times before ending. If the user select End by and specifies a Day, Month, and Year (drop down boxes), then the search will end on the entered date.

Regarding the search data returned, the user specifies the data to be displayed in the search results. For aircraft, for the example, the data includes Aircraft Type, Contact Name, Contact Telephone Number, and Contact Email.

The user also selects how the search results are to be sorted. Three layers for sorting are providing, and the user can select whether the data is to be sorted in ascending or descending order.

Figure 11:
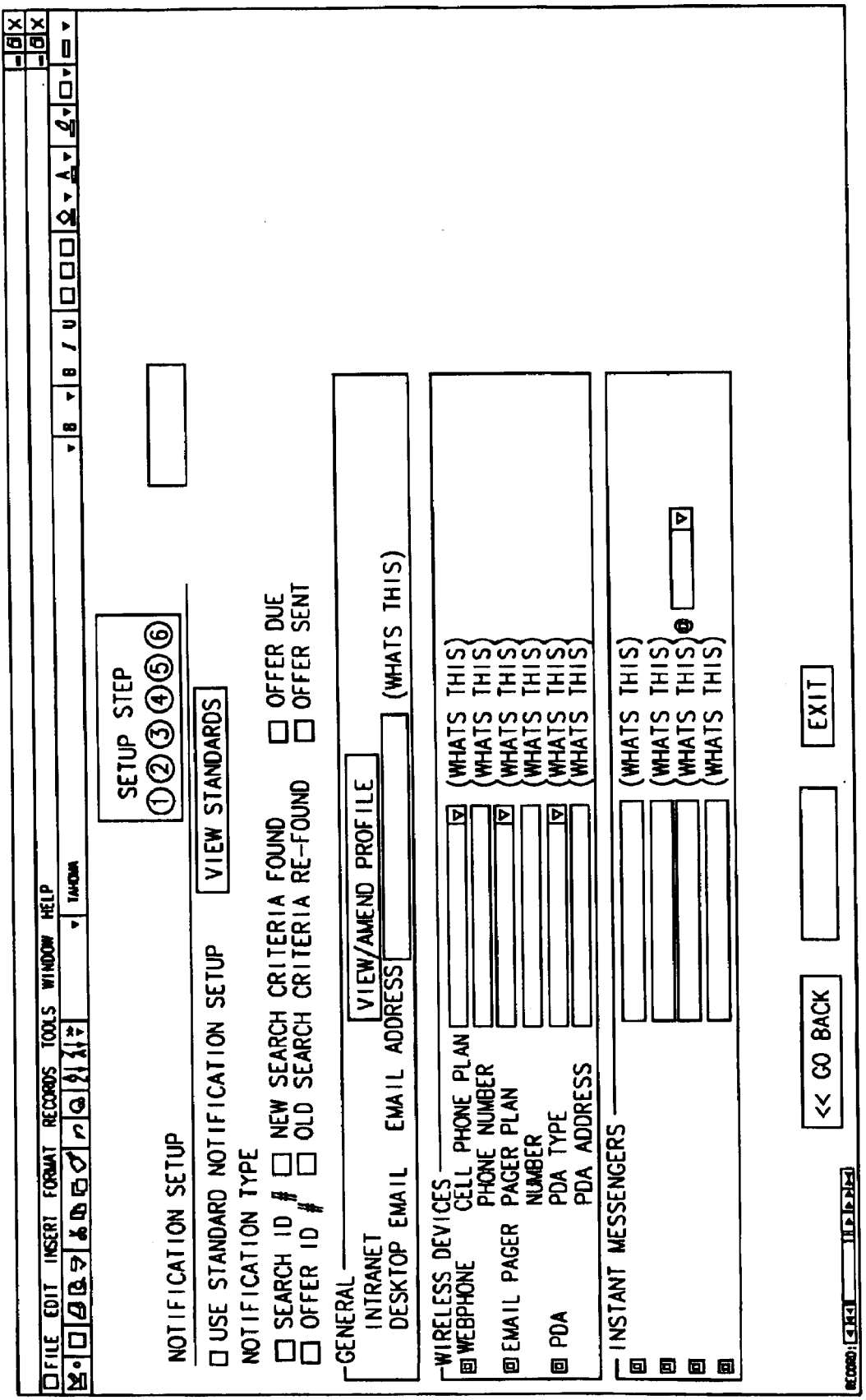
FIG. 11 illustrates an exemplary screen shot for notification setup.

Upon selecting Proceed, processing proceeds to the screen shown in FIG. 11. The user can also select "Go Back" to return processing to the screen shown in FIG. 9 or EXIT to return processing to the screen shown in FIG. 3.

FIG. 11 illustrates an exemplary screen shot for notification setup. Using this screen, users define the notifications to be received and how the notifications are to be sent. For example, a user can select Use standard notification setup, and if this is selected, then the standard notification setup as explained below in connection with FIG. 20 is used. Next to the "Use standard notification setup" is a command button for View Standards which, if selected, causes processing to proceed to the screen illustrated in FIG. 20 so that the user can view the standards and make an informed decision whether to select the standard notification setup.

The User can be sent various notifications via the notification methods selected. The notification message includes, for example, an ID# and a link which links the user to the appropriate screen for that notification. For example, if Search ID# is selected, the user is provided with a search identifier number when completing the search setup as described in connection with FIG. 12. An e-mail also is sent to the user with the number.

If Offer ID# is selected, then the user is provided with an offer identification number when completing the offering setup as described in connection with FIG. 17. An e-mail also is sent to the user with the number.

If the user selects New Search Criteria Found, then the user will receive an e-mail when an automated (timed repeated) search finds a new match. If the user selects Old Search Criteria Re-Found, then the user receives an e-mail when an automated (timed repeated) search finds a old match again. If the user selects Offer Due, then the user receives an e-mail when an offering is due to go out. As explained in connection with FIG. 16, the user can specify whether an offering is automatically sent if the search finds a match. If Offer Sent is selected, then the user receives an e-mail when an offering is sent out. The URL attached to the message takes the user to the screen illustrated in FIG. 18.

Regarding general notifications, if the user has set preferences in the profile, then these preferences will appear. If the preferences have not been set, then the e-mail "check" box will be checked and their e-mail address entered. The user can select more than one option for notification. For example, if the user is accessible via an intranet, then notification messages can be sent to a designated address on the intranet. Links can be associated with the notification to bring the user to the appropriate location. In addition, an e-mail notification can be received at the desktop (i.e., the user enters the desired e-mail address to be used). If the user selects to view/amend profile, then processing proceeds to the screen illustrated in FIG. 24.

For wireless devices, a user enters a cell phone plan and phone number for a web phone and/or e-mail pager. If the message is to go to a PDA, the user enters the PDA type and PDA address. For instant messengers, a user enters the instant messenger addresses to which the notifications are to be sent.

Figure 12:
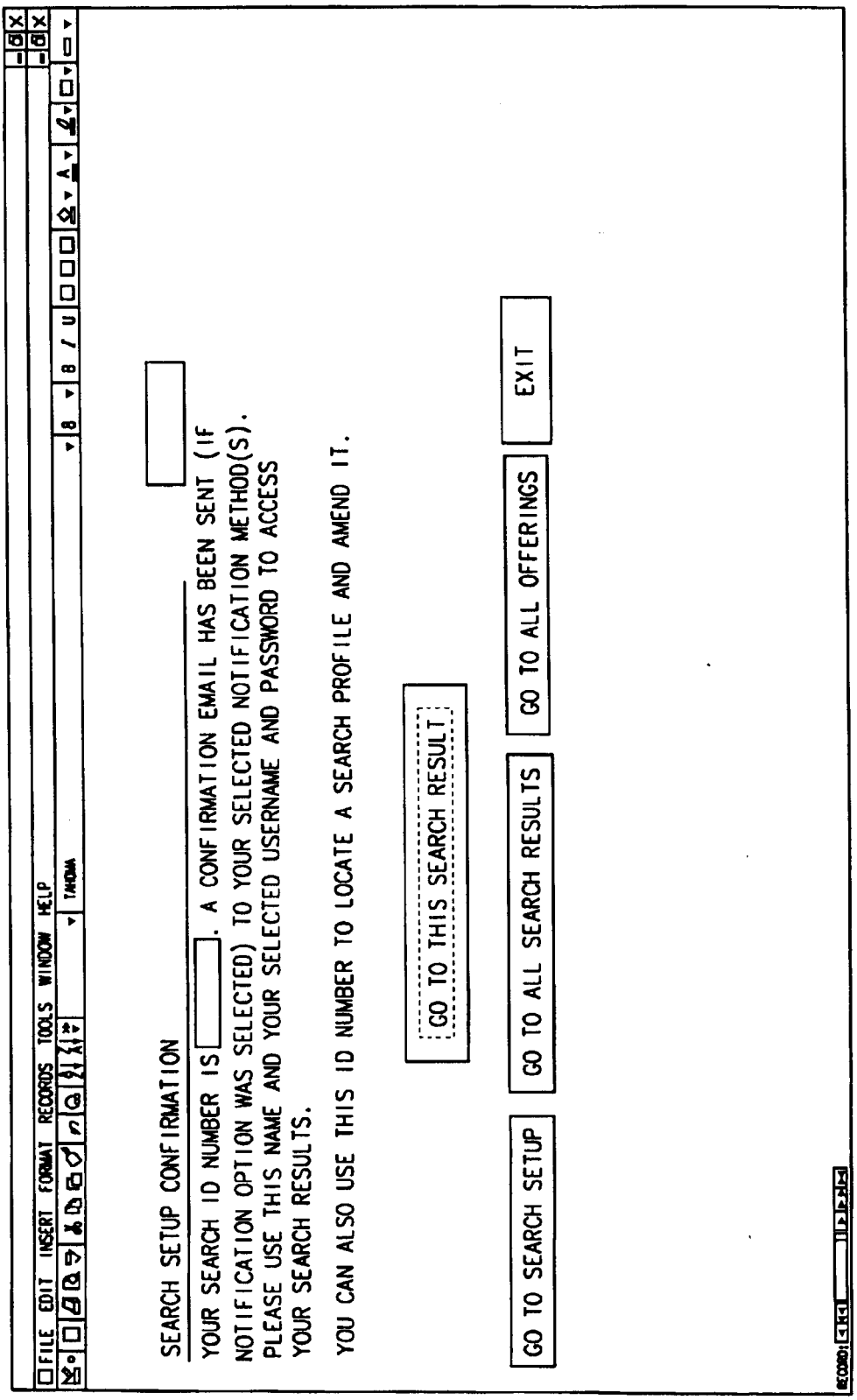
FIG. 12 illustrates an exemplary screen shot for a search setup confirmation.

Upon selecting Proceed, processing proceeds to the screen shown in FIG. 12. The user can also select "Go Back" to return processing to the screen shown in FIG. 10 or EXIT to return processing to the screen shown in FIG. 3.

FIG. 12 illustrates an exemplary screen shot for a search setup confirmation. Using this screen, users are provided with a confirmation number if the user has requested one (see FIG. 11). In addition, an e-mail is generated and sent to the user in accordance with the user selections. On this screen, the user can also select Go to Search Setup, Go to All Search Results, and Go to All Offerings. If the user selects Go to Search Setup, processing proceeds to the screen illustrated in FIG. 6. If the user select Go to All Search Results, then processing proceeds to the screen illustrated in FIG. 8. If the user selects Go to All Offerings, then processing proceeds to the screen illustrated in FIG. 19. If the user selects Exit, then processing proceeds to the screen illustrated in FIG. 3.

Figure 13:
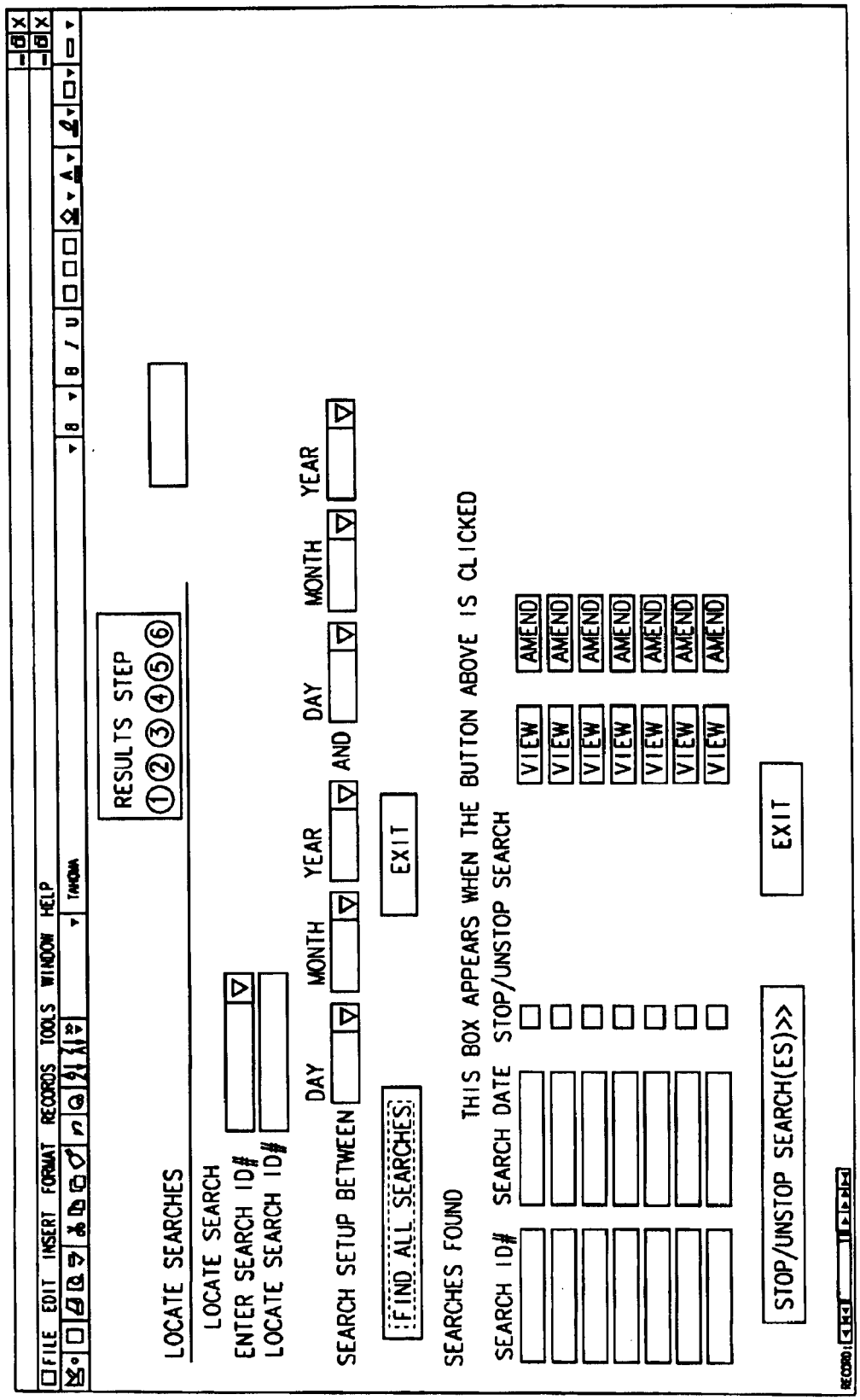
FIG. 13 illustrates an exemplary screen shot for a screen for locating searches.

FIG. 13 illustrates an exemplary screen shot for a screen for locating searches. At the top of this screen, a graphic is displayed illustrating the step being executed by the user. The graphic communicates to the user how many steps are involved in the process and where they are in the process. Generally, via the screen illustrated in FIG. 13, a user can locate searches that were done in the past to view, amend or stop the search. If the user knows the search identification number, that number can be entered to locate the corresponding search results. In addition, and to locate a search identification number a user can use a drop down to locate search numbers. Searches applicable to the specific user are listed in the drop down.

A user also can search by date. Specifically, a user can enter a date from, a date to, or both. The user can select from drop downs to enter a day, month and year for both dates from and to.

Further, a user can select Find All Searches. When a user makes this selection, the data shown in the Searches Found section is shown. All search identification numbers applicable for the parameters that the user entered are shown. In addition, the search date for each search identification number is displayed.

If the user selects Stop/Unstop Search, the user can either stop a search or restart it. The search results for a stopped search are saved in the database. If a search has already finished based on the search parameters, then the "check" box is automatically "checked". In this instance, the user can "Amend" to change the search parameters to restart the search. If the user selects view, then processing proceeds to the screen illustrated in FIG. 14. If the user selects amend, then processing proceeds to the screen illustrated in FIG. 6. The amended search is assigned a new Search ID#. If the user selects Exit, then processing proceeds to the screen illustrated in FIG. 3.

FIG. 14 illustrates an exemplary screen shot for a screen for viewing search results. Generally, all the search results that match the user search setup are displayed. Users can then select various options to customize the search results to send out offerings. All search returns are displayed in accordance with the preferences as specified in connection with the screen illustrate din FIG. 10.

The search identification number and search date fields are provided to identify the search to the user. The sort data by function is the same as described above in connection with FIG. 10.

If the user selects Interested in all in the "select all" box, then the offers will be made against all results to the customer. If the user selects "Standard Product Offering", the standard list of products as specified in connection with the screen illustrated in FIG. 20 are included in the offering for all search results. If the user selects "Custom product offering", the user has the option to customize the products offered for all search returns.

If the User selects "Standard offering text" in the "select all" box, the standard list of products as specified in connection with the screen illustrated in FIG. 20 is included in the offering for all search results. If the user selects "Custom offering text" in the "select all" box, the user has the option to customize the products offered for all search returns.

The user can select View Standards in order to view the standards displayed on the screen as illustrated in FIG. 20 so that the user can make an informed decision whether to select the standard options. Selecting Go Back results in taking the user back to the screen illustrated in FIG. 13. If the user selected Standard product offering and "Standard offering text Offering and then selects Proceed, processing continues with the screen illustrated in FIG. 17. If the user selected Custom product offering and then selects proceed, processing continues with the screen illustrated in FIG. 16. If the user selects Customise by result, then the user can customize each search result individually.

For the search results, and for a particular search identification number, a text box is displayed with the format Result X of X. All data that was found by the search engine is displayed in the format illustrated in FIG. 14. The aircraft type, contact name, telephone and e-mail are displayed, if found. Other fields are displayed if the user selected such fields on the screen illustrated in FIG. 10.

If a web location is found, the URL where the data was found is displayed. If the user selects View Website, processing proceeds to the URL at which the data was found. If the user selects Interested, the search result can then be customized for product and offering text or simply sent as a standard offering.

If the User selects "Standard product offering for an individual search result, the standard list of products as displayed on the screen shown in FIG. 20 is included in the offering for that individual search result. If the user selects Custom product offering, the user has the option to customize the products offered for that individual search return.

If the User selects "Standard offering text", the standard list of products as specified in connection with the screen illustrated in FIG. 20 is included in the offering for that individual search result. If the user selects "Custom offering text", the user has the option to customize the products offered for that individual search return.

The user can select View Standards in order to view the standards displayed on the screen as illustrated in FIG. 20 so that the user can make an informed decision whether to select the standard options.

Figure 15:
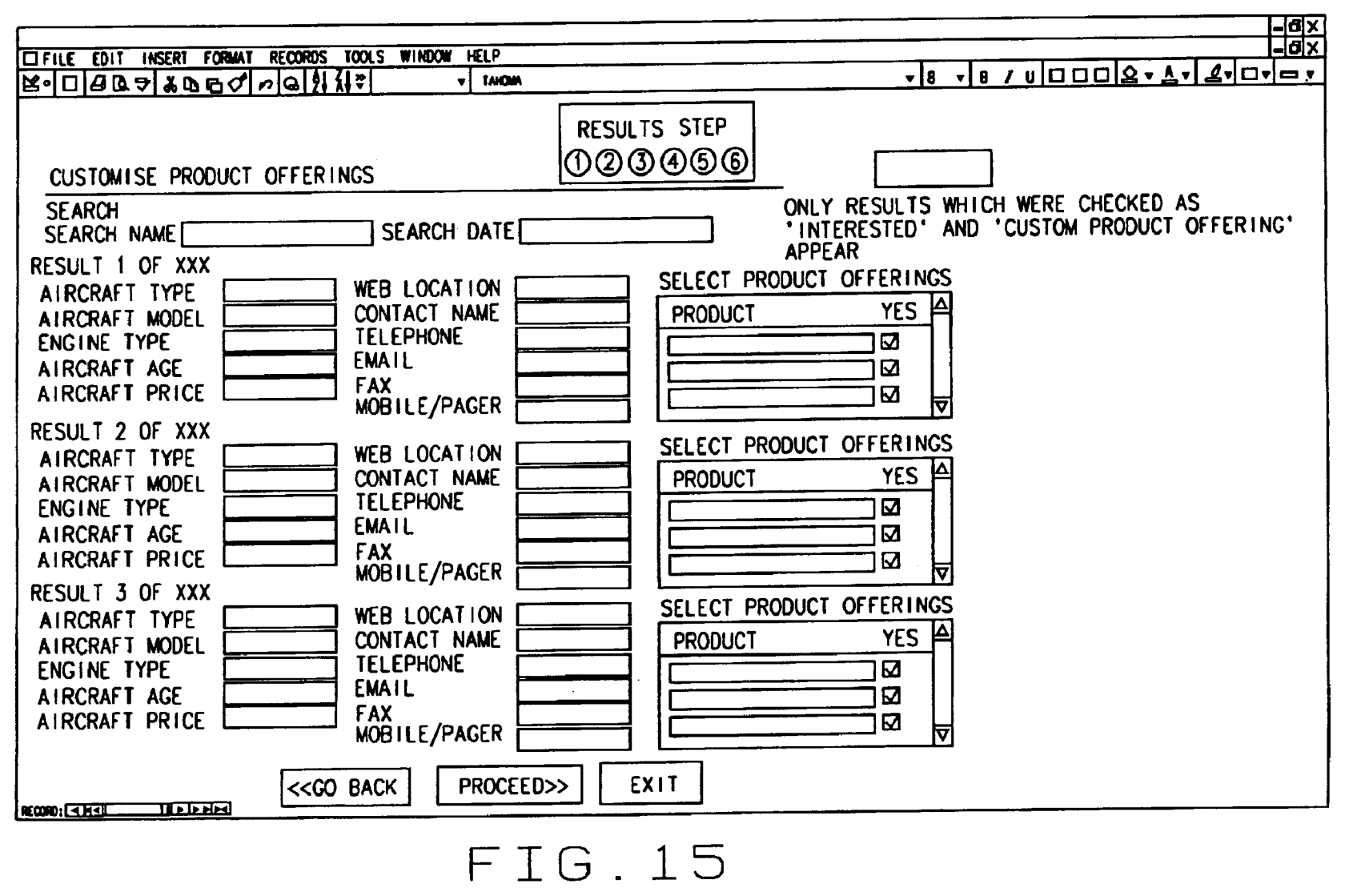

Selecting Proceed results in processing proceeding to the screen illustrated in FIG. 15. Selecting Go Back results in taking the user back to the screen illustrated in FIG. 13. Selecting EXIT results in processing returning to the screen illustrated in FIG. 3.

FIG. 15 illustrates an exemplary screen shot for a screen for customising product offerings. Generally, via the screen illustrated in FIG. 15, a user customizes the product offerings by search result that was selected on the screen illustrated in FIG. 14. Regarding the screen illustrated in FIG. 15, the search identification number and search date identify the search to the user. The data found by the search engine is displayed in the format illustrated in FIG. 15. Specifically, the aircraft type, contact name, telephone and e-mail are displayed, if found. Other fields are displayed if the user selects those fields on the screen illustrated in FIG. 10.

All product offerings (as specified in the screen illustrated in FIG. 24) are displayed in the table next to each search result. Next to each product is a "check" box, and if the User selects the "check" box, the corresponding product will be offered. The user can select multiple products for each search result.

Selecting Proceed results in processing proceeding to the screen illustrated in FIG. 16. Selecting Go Back results in taking the user back to the screen illustrated in FIG. 14. Selecting EXIT results in processing returning to the screen illustrated in FIG. 3.

FIG. 16 illustrates an exemplary screen shot for a screen for customising product text offerings. Generally, via the screen illustrated in FIG. 16, a user customizes the text offerings by search result that was selected on the screen illustrated in FIG. 14. The search identification number and search date fields identify the search to the user. All data found by the search engine is displayed in the format illustrated in FIG. 19. The aircraft type, contact name, telephone and e-mail are displayed, if found. Other fields are displayed if the fields are selected by the user on the screen illustrated in FIG. 10. The standard text offering (as set forth in the screen illustrated in FIG. 24 is displayed next to each result. The text is editable, and dispersed within the text are fields (indicated by [abc]) that are fed data from the database. The user does not edit these text fields.

Selecting Proceed results in processing proceeding to the screen illustrated in FIG. 17. Selecting Go Back results in taking the user back to the screen illustrated in FIG. 15. Selecting EXIT results in processing returning to the screen illustrated in FIG. 3.

FIG. 17 illustrates an exemplary screen shot for a screen for confirming that an offer had been sent. Generally, via the screen illustrated in FIG. 17, a user is provided with an Offer Sent Confirmation Number. If the user has requested, an email will also be generated and sent to the address specified by the user. If the user select I want my offering to go automatically each time unless the search result changes, then repeat offerings will be automatically sent.

The user also can select Go to This Offering Result, Go to Search Setup, Go to All Search Results, and Go to All Offerings. If the user selects Go to This Offering Results, then processing proceeds to the screen illustrated in FIG. 18 and the offering results for the offering just set up will be displayed. If the user selects Go to Search Setup, the processing proceeds to FIG. 6. If the user selects Go to All Search Results then processing proceeds to the screen illustrated in FIG. 13. If the user selects Go to All Offerings, then processing proceeds to the screen illustrated in FIG. 19. If the user selects EXIT, then processing proceeds tot the screen illustrated in FIG. 3.

Figure 18:
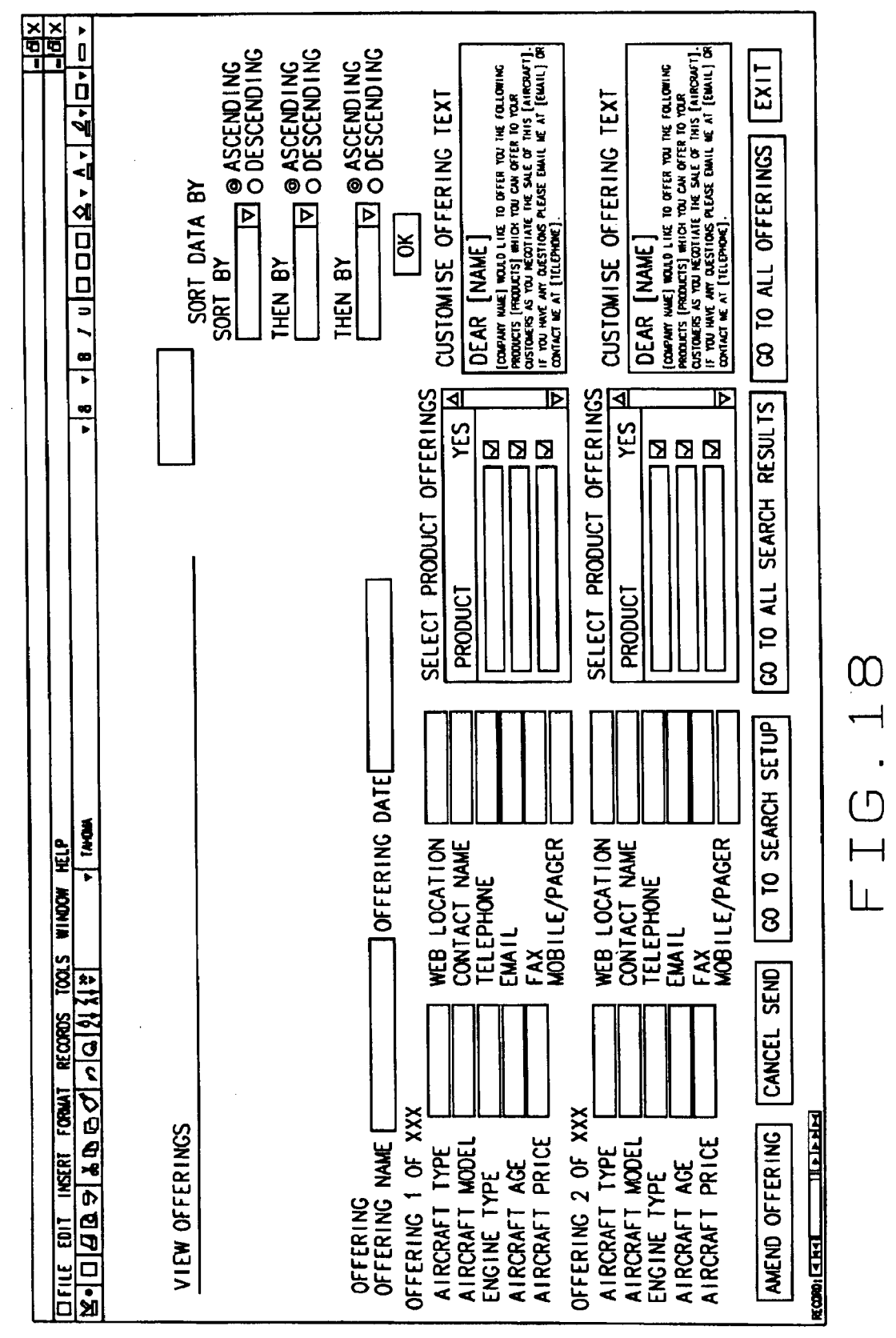

FIG. 18 illustrates an exemplary screen shot for a screen for viewing offerings. Generally, via the screen illustrated in FIG. 18, a user can view each offering that was sent out or is due to be sent out. The search identification number and search date identify the search to the user. The sort data by function operates as described above. The search data returned is all data found by the search engine, and such data is displayed as illustrated in FIG. 18. The aircraft type, contact name, telephone and e-mail are displayed, if found. Other fields are displayed if the user has selected such fields for display.

Regarding the Select Product Offerings, all product offerings selected on the screen illustrated in FIG. 15 are displayed in the table next to each search result. The check box indicates that this product was offered. All text offerings selected on the screen illustrated in FIG. 16 are displayed in the table next to each search result.

If the user selects Amend Offering, then processing proceeds to the screen illustrated in FIG. 14 and the search results for the offering are displayed. If the user selects Cancel Offering, then processing proceeds to the screen illustrated in FIG. 19. If the user selects Go to Search Setup, then processing proceeds to the screen illustrated in FIG. 6. If the user selects Go to All Search Results, then processing proceeds to the screen illustrated in FIG. 13. If the user selects Go to All Offerings, then processing proceeds to the screen illustrated in FIG. 19. If the user selects EXIT, then processing proceeds to the screen illustrated in FIG. 3.

FIG. 19 illustrates an exemplary screen shot for a screen for locating offerings. Generally, via the screen illustrated in FIG. 19, a user can locate offerings that were done in the past or are due, and amend or stop the offering. To locate an offer, the user enters the offer identification number or locates an offer identification number via a drop down. The user also can locate an offer by entering a date from, a date to, or both. Once the user selects Find All Offerings, then the offer identification numbers applicable for the parameters that the user entered are displayed. If the user selects EXIT, then processing returns to the screen illustrated in FIG. 3.

For the offerings found, the offer identification number, date due, and date sent for each found offer are displayed. If an offer has been sent, then the check box for Sent? is checked. If the user wants to send an offer, then the user selects the check box for Send? If the user selects View, then processing proceeds to the screen illustrated in FIG. 18. Also, if the user selects Amend, the processing proceeds to the screen illustrated in FIG. 14.

Once the user selects Send Offerings, then all offers that have been checked for Send? are sent. If the user selects EXIT, then processing proceeds to the screen illustrated in FIG. 3.

FIGS. 20–23 illustrate an exemplary screen shot for a screen for defining standards. Generally, via the screen illustrated in FIGS. 20–23, a user defines the standards used in other portions of the system. Specifically, the standards are used to speed up data entry. The standards can be amended Users who have been granted the appropriate rights can amend these standards via the screen illustrated in FIG. 24.

Referring to FIG. 20, the functionality accessible via the standards screen includes Asset Standards, which is a table that display variations of aircraft type, model, engine, age to, age from, price to and price from, that the user has entered. A check box next to each variation can be selected to indicate if that variable is still a standard for the corresponding row of data. A user can "switch" on and off standards using such check box. Filter selections above each column in the asset standards table are provided so that a user can set up the table quickly and can view a subset of data quickly.

The Standard Websites Searched table lists all the standard web sites that the users have entered. A check box next to each web site is provided so that a user can indicate if the corresponding web site is still standard, and also allows a user to switch on and off the standards.

The Standard Web Publications Searched table lists all the standard web publications that the Users have entered. A check box next to each web publication is provided so that a user can indicate if the corresponding web publication is still standard, and also allows a user to switch on and off the standards.

Using the Standard Search Parameters, which includes search pattern, search timing, and search data returned, the user can select standards that are then applied to all searches performed. Similarly and using the Standard Notification Setup, which includes notification type, general, wireless devices, and instant messengers, the user can select standards that are then applied when sending notifications.

The Standard Products Offered?" table lists all the standard product names that the users have entered. A check box next to each product name is provided so that a user can indicate if that product name is still standard, and also provides that a user can switch on and off standards. The Standard Offering Text is editable and dispersed within the text are fields (indicated by [abc]) that are fed data from the database. The user does not edit the data from the database that populates the fields. The Amend Standard command button is provided so that a user can amend the corresponding standard.

If the user selects SAVE And EXIT, the selections are saved in the database and processing returns to the screen from which the user entered this screen. If the user selects Go to Search Setup, then processing proceeds to the screen illustrated in FIG. 6. If the user selects Go to Search Results then processing proceeds to the screen illustrated in FIG. 13. If the user select Go to Offerings, then processing proceeds to the screen illustrated in FIG. 19.

FIGS. 24–25 illustrate an exemplary screen shot for a screen for user administration. Generally, via the screen illustrated in FIGS. 24–25, a users who have administration rights can set up other Users. Generally, to Find Email Address, a drop down is provided that lists all e-mail addresses of persons who have attempted to register. The user can select an e-mail address and then select "Set Up User". Upon making such selection a User Profile table to displayed all fields for which data is available are automatically populated. The data is captured when the person registered and is associated with the e-mail address in the registration database table. If no email address, then a blank form is displayed. The Find User Profile is a drop down and has the last name, followed by the first name for every active user profile. The user can select a profile and then select Amend User to open the appropriate user profile.

The User Profile Table includes the following fields, namely, First Name, Last Name, Company, Telephone, Fax, Email, User Name, Password, and Retype Password. In addition, User Rights are specified. Such rights include Administration Access, Amend Other Users (i.e., the user can access and amend other user profiles), Amend Personal Profile (i.e, the user can access their profile), Delete Users (i.e., the user can delete other users), Create Searches (i.e., the users can create searches), Make Offerings (i.e., the users can make offerings) and Amend Standards (i.e., the users can amend standards).

For e-mail notifications, the user can define how e-mail notifications are to be received. If the User selects "Save User Profile", then the user file is saved in the database. If any mandatory fields are not complete, then a pop up box is displayed identifying the fields to be completed. Similarly, if the password field is less then 6 characters, then a pop up box is displayed to inform the user to enter at least 6 characters. Also, if the "Password" and "Retype Password" fields are different, then a pop up box is displayed informing the user to reenter the "Retype Password" field.

When the user selects Save User Profile, all the data the user entered is saved in the database. If the user is authorized, the user can select Delete User to remove the entire profile. The data associated with the removed user will still be saved in the database in case it has to be retrieved at a later date. If the user selects EXIT, processing proceeds to the screen illustrated in FIG. 3.

While the invention has been described in terms of various specific embodiments, those skilled in the art will recognize that the invention can be practiced with modification within the spirit and scope of the claims.

What is claimed is:

1. A method for managing financial offerings submitted by a financing source using a computer system associated with the financing source, the financial offerings include at least one financial product for financing a potential transaction, said method comprising the steps of:

executing a search using the computer system to identify potential transactions that meet pre-defined criteria, the potential transactions involve at least one of selling and leasing assets including at least one of an aircraft, an automobile, a rail car, and a barge;

generating at the financing source a financial offering for at least one of the identified potential transactions;

assigning at least one of a standard financial product offering having standard offering text and a customized financial product offering having customized offering text to at least one of the identified potential transactions, the standard financial product offering includes at least one of a financing product and a leasing product stored in a database in communication with the computer system, the customized financial product offering includes at least one of a financing product and a leasing product having terms and conditions entered into the computer system by the financing source;

automatically transmitting via the computer system the at least one standard financial product offering and customized financial product offering from the financing source to a first party to the assigned potential transaction;

automatically notifying the financing source via the computer system when the offering has been transmitted to the first party;

enabling the financing source to withdraw the at least one standard financial product offering and customized financial product offering transmitted to the first party prior to the first party and a second party reaching an agreement to at least one of sell and lease at least one of the assets; and enabling the financing source to amend the at least one standard financial product offering and customized financial product offering transmitted to the first party prior to the first party and the second party reaching an agreement to at least one of sell and lease the at least one of the assets.

2. A method according to claim 1 wherein executing the search comprises prompting a user to define assets to be searched for and prompting the user to select search targets.

3. A method according to claim 2 wherein defining assets to be searched for comprises selecting at least one of a model, type, and age of the asset.

4. A method according to claim 2 wherein selecting search targets comprises identifying at least one web site or web publication as a search target.

5. A method according to claim 2 wherein executing the search further comprises the step of prompting a user to define search parameters, the search parameters comprising at least one of a search pattern, search timing, and search data to be returned.

6. A method according to claim 1 further comprising the step of prompting a user to select a manner in which the user is to be notified of search results.

7. A method according to claim 1 wherein generating at the financial source a financial offering comprises the steps of associating a product offering and offering text with a search result.

8. A computer for managing financial offerings submitted by a financing source, the financial offerings include at least one financial product for financing a potential transaction, said computer having a database, said computer programmed to:
   execute a search to identify potential transactions that meet pre-defined criteria, the potential transactions involve at least one of selling and leasing assets including at least one aircraft;
   generate a financial offering for at least one of the identified potential transactions;
   assign at least one of a standard financial product offering having standard offering text and a customized financial product offering having customized offering text to at least one of the identified potential transactions, the standard financial product offering includes at least one of a financing product and a leasing product stored in the database, the customized financial product offering includes at least one of a financing product and a leasing product having terms and conditions entered into said computer by the financing source;
   automatically transmit the at least one standard financial product offering and customized financial product offering from the financing source to a first party to the assigned potential transaction;
   automatically notify the financing source when the offering has been transmitted to the first party;
   enable the financing source to withdraw the at least one standard financial product offering and customized financial product offering transmitted to the first party prior to the first party and a second party reaching an agreement to at least one of sell and lease the assets; and
   enable the financing source to amend the at least one standard financial product offering and customized financial product offering transmitted to the first party prior to the first party and the second party reaching an agreement to at least one of sell and lease the assets.

9. A computer according to claim 8 wherein to execute the search, the computer prompts a user to define assets to be searched for and prompts the user to select search targets.

10. A computer according to claim 9 wherein prompting the user to define assets to be searched for comprises prompting the user to select at least one of a model, type, and age of the asset.

11. A computer according to claim 9 wherein prompting the user to search targets comprises prompting the user to identify at least one web site or web publication as a search target.

12. A computer according to claim 9 wherein to execute the search, said computer is programmed to further prompt a user to define search parameters, the search parameters comprising at least one of a search pattern, search timing, and search data to be returned.

13. A computer according to claim 8 further programmed to prompt a user to select a manner in which the user is to be notified of search results.

14. A computer according to claim 8 wherein to generate an offer said computer is programmed to prompt a user to associate a product offering and offering text with a search result.

15. A database for managing financial offerings submitted by a financing source, the financial offerings include at least one financial product for financing a potential transaction, said database comprising:
   data relating to at least one asset to be identified through a search to be performed using pre-defined criteria;
   data corresponding to the search to be performed;
   data identifying potential transactions that satisfy the pre-defined criteria, the potential transactions involve at least one of selling and leasing assets including at least one of an aircraft, an automobile, a rail car, and a barge;
   data corresponding to financial offerings generated utilizing search results from the performed search;
   data corresponding to assigning at least one of a standard financial product offering having standard offering text and a customized financial product offering having customized offering text to at least one of the identified potential transactions, the standard financial product offering includes at least one of a financing product and a leasing product, the customized financial product offering includes at least one of a financing product and a leasing product having terms and conditions entered by the financing source;
   data corresponding to transmitting the at least one standard financial product offering and customized financial product offering from the financing source to a first party to the assigned potential transaction;
   data corresponding to notifying the financing source when the offering has been transmitted to the first party;
   data corresponding to prompting the financing source to withdraw the at least one standard financial product offering and customized financial product offering transmitted to the first party prior to the first party and a second party reaching an agreement to at least one of sell and lease the assets; and
   data corresponding to prompting the financing source to amend the at least one standard financial product offering and customized financial product offering transmitted to the first party prior to the first party and the second party reaching an agreement to at least one of sell and lease the assets.

16. A database according to claim 15 wherein the asset data comprises at least one of asset type, model, and age.

17. A database according to claim 15 wherein the search data comprises at least one web site or web publication as a search target.

18. A system for managing financial offerings submitted by a financing source, the financial offerings include at least one financial product for financing a potential transaction, said system comprising:
   a database comprising data corresponding to searches to be performed and data corresponding to financial offerings generated utilizing search results from the performed searches, and
   a server associated with the financing source configured to:
      execute a search to identify potential transactions that meet pre-defined criteria wherein the potential transactions involve at least one of selling and leasing assets including at least one of an aircraft, an automobile, a rail car, and a barge,
      generate a financial offering for at least one of the identified potential transactions assign at least one of a standard financial product offering having standard offering text and a customized financial product offering having customized offering text to at least one of the identified potential transactions, the standard financial product offering includes at least one of a financing product and a leasing product, the customized financial product offering includes at least one of a financing product and a leasing product having terms and conditions provided by the financing source, automatically transmit the at least one standard financial product offering and customized financial product offering from the financing source to a first party to the assigned potential transaction, automatically notify the financing source when the offering has been transmitted to the first party, enable the financing source to withdraw the at least one standard financial product offering and customized financial product offering transmitted to the first party prior to the first party and a second party reaching an agreement to at least one of sell and lease the assets; and enable the financing source to amend the at least one standard financial product offering and customized financial product offering transmitted to the first party prior to the first party and the second party reaching an agreement to at least one of sell and lease the assets.

19. A system according to claim 18 wherein to execute the search, said server prompts a user to define assets to be searched for and prompts the user to select search targets.

20. A system according to claim 19 wherein prompting the user to define assets to be searched for comprises prompting the user to select at least one of a model, type, and age of the asset.

21. A system according to claim 19 wherein prompting the user to search targets comprises prompting the user to identify at least one web site or web publication as a search target.

22. A system according to claim 19 wherein to execute the search, said server is programmed to further prompt a user to define search parameters, the search parameters comprising at least one of a search pattern, search timing, and search data to be returned.

23. A system according to claim 18 wherein said server is further programmed to prompt a user to select a manner in which the user is to be notified of search results.

24. A system according to claim 18 wherein to generate an offer said server is programmed to prompt a user to associate a product offering and offering text with a search result.

25. Apparatus for managing financial offerings submitted by a financing source, the financial offerings include at least one financial product for financing a potential transaction, said apparatus comprising:

means for executing a search to identify potential transactions that meet pre-defined criteria, the potential transactions involve at least one of selling and leasing assets including at least one aircraft;

means for generating a financial offering for at least one of the identified potential transactions;

means for assigning at least one of a standard financial product offering having standard offering text and a customized financial product offering having customized offering text to at least one of the identified potential transactions, the standard financial product offering includes at least one of a financing product and a leasing product, the customized financial product offering includes at least one of a financing product and a leasing product having terms and conditions provided by the financing source;

means for automatically transmitting the at least one standard financial product offering and customized financial product offering from the financing source to a first party to the assigned potential transaction;

means for automatically notifying the financing source when the offering has been transmitted to the first party;

means for enabling the financing source to withdraw the at least one standard financial product offering and customized financial product offering transmitted to the first party prior to the first party and a second party reaching an agreement to at least one of sell and lease the assets; and means for enabling the financing source to amend the at least one standard financial product offering and customized financial product offering transmitted to the first party prior to the first party and the second party reaching an agreement to at least one of sell and lease the assets.

26. Apparatus according to claim 25 wherein said executing means comprises means for prompting a user to define assets to be searched for and prompting the user to select search targets.

27. Apparatus according to claim 25 further comprising means for prompting a user to select a manner in which the user is to be notified of search results.

28. Apparatus according to claim 25 wherein said generating means comprises means for associating a product offering and offering text with a search result.

29. A computer-readable medium for managing financial offerings submitted by a financing source wherein the financial offerings include at least one financial product for financing a potential transaction, said computer readable-medium executable by a computer for controlling the computer to:

execute a search to identify potential transactions that meet pre-defined criteria, the potential transactions involve at least one of selling and leasing assets including at least one of an aircraft, an automobile, a rail car, and a barge;

generate a financial offering for at least one of the identified potential transactions;

assign at least one of a standard financial product offering having standard offering text and a customized financial product offering having customized offering text to at least one of the identified potential transactions, the standard financial product offering includes at least one of a financing product and a leasing product stored in a database in communication with the computer, the customized financial product offering includes at least one of a financing product and a leasing product having terms and conditions entered into the computer by the financing source;

automatically transmit the at least one standard financial product offering and customized financial product offering from the financing source to a first party to the assigned potential transaction;

automatically notify the financing source when the offering has been transmitted to the first party;

enable the financing source to withdraw the at least one standard financial product offering and customized financial product offering transmitted to the first party prior to the first party and a second party reaching an agreement to at least one of sell and lease the assets; and enable the financing source to amend the at least one standard financial product offering and customized financial product offering transmitted to the first party prior to the first party and the second party reaching an agreement to at least one of sell and lease the assets.

30. A computer-readable medium according to claim 29 wherein to execute the search the computer is controlled to prompt a user to define assets to be searched for and prompting the user to select search targets.

31. A computer-readable medium according to claim 29 wherein the computer is further controlled to prompt a user to select a manner in which the user is to be notified of search results.

32. A computer-readable medium according to claim 29 wherein to generate an offering the computer is controlled to associate a product offering and offering text with a search result.

33. A computer-readable medium according to claim 29 wherein the computer is further controlled to notify a user when an offering has been transmitted to the party.

\* \* \* \* \*